US012647200B2

(12) United States Patent
Liu et al.

(10) Patent No.: US 12,647,200 B2
(45) Date of Patent: Jun. 2, 2026

(54) COMMUNICATION METHOD AND APPARATUS IN WIRELESS COMMUNICATION SYSTEM

(71) Applicant: HUAWEI TECHNOLOGIES CO., LTD., Shenzhen (CN)

(72) Inventors: Peng Liu, Shenzhen (CN); Ziyang Guo, Shenzhen (CN); Chunqing Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 786 days.

(21) Appl. No.: 17/981,864

(22) Filed: Nov. 7, 2022

(65) Prior Publication Data

US 2023/0063415 A1 Mar. 2, 2023

Related U.S. Application Data

(63) Continuation of application No. PCT/CN2021/092368, filed on May 8, 2021.

(30) Foreign Application Priority Data

May 8, 2020 (CN) .......................... 202010381950.9

(51) Int. Cl.
*H04L 1/00* (2006.01)
*H04B 1/713* (2011.01)
*H04B 17/309* (2015.01)

(52) U.S. Cl.
CPC ........... *H04L 1/0026* (2013.01); *H04B 1/713* (2013.01); *H04B 17/309* (2015.01)

(58) Field of Classification Search
CPC ....... H04L 1/0026; H04B 1/713; H04B 17/24; H04B 2001/7154; H04B 1/7143;

(Continued)

(56) References Cited

U.S. PATENT DOCUMENTS

| | | | |
|---|---|---|---|
| 7,046,644 B1 | 5/2006 | Lappetelainen | |
| 2013/0100906 A1* | 4/2013 | Yano ..................... | H04L 1/0027 |
| | | | 370/329 |

(Continued)

FOREIGN PATENT DOCUMENTS

| | | |
|---|---|---|
| CN | 105589506 A | 5/2016 |
| CN | 107889149 A | 4/2018 |

(Continued)

OTHER PUBLICATIONS

International Search Report issued in corresponding International Application No. PCT/CN2021/092368, dated Jul. 29, 2021, pp. 1-10.

(Continued)

*Primary Examiner* — Rownak Islam
(74) *Attorney, Agent, or Firm* — HAUPTMAN HAM, LLP

(57) ABSTRACT

A communication method and apparatus usable in, a wireless communication scenario supporting a frequency hopping technology. The method includes a first terminal device receives first channel quality reporting information sent by a second terminal device. Herein, a format of the first channel quality reporting information is one of at least two preset formats, and precision of channel quality parameters of target channels included in first channel quality reporting information in different formats is different. The first terminal device parses the first channel quality reporting information, to obtain a channel quality parameter of at least one target channel. According to the method in some embodiments, flexibility of channel quality reporting is improved.

21 Claims, 6 Drawing Sheets

(58) Field of Classification Search
CPC .. H04B 17/309; H04W 40/246; H04W 40/12;
H04W 24/08; H04W 24/10
USPC ......................................................... 370/252
See application file for complete search history.

(56)                          References Cited

U.S. PATENT DOCUMENTS

2017/0245285 A1 *   8/2017  Palin ................... H04W 72/542
2018/0302908 A1 *  10/2018  Aijaz ...................... H04L 45/28

FOREIGN PATENT DOCUMENTS

CN          108449114  A      8/2018
CN          107995133  B  *  12/2019   ............. H04B 1/715
CN          108449114  B  *   1/2020   ............. H04W 4/80
EP          3211937  A1     8/2017

OTHER PUBLICATIONS

Extended European Search Report issued in corresponding European Application No. 21800063.6, dated Sep. 25, 2023, pp. 1-7.
Chinese Office Action issued in corresponding Chinese Application No. 202010381950.9, dated Oct. 21, 2023, pp. 1-11.

* cited by examiner

First terminal device

Second terminal device

Channel identifier

Availability indication identifier

| Channel 0 | 1 |
|---|---|
| Channel 1 | 0 |
| Channel 2 | 1 |
| ... | ... |
| Channel N1–2 | 0 |
| Channel N1–1 | 1 |

COMMUNICATION METHOD AND APPARATUS IN WIRELESS COMMUNICATION SYSTEM

CROSS-REFERENCE TO RELATED APPLICATIONS

This application is a continuation of International Application No. PCT/CN2021/092368, filed on May 8, 2021, which claims priority to Chinese Patent Application No. 202010381950.9, filed on May 8, 2020. The disclosures of the aforementioned applications are hereby incorporated in entirety by reference.

BACKGROUND

With continuous development of wireless communication technologies, products having a short-range wireless transmission capability are increasingly diversified, and a quantity of users of these products is further continuously increasing. Currently, most of these products use a Bluetooth technology or a derived Bluetooth technology for information transmission. However, because the Bluetooth technology shares a spectrum with a Wi-Fi technology or a ZigBee technology, wireless communication interference occurs. To reduce such interference, a frequency hopping technology is proposed. The frequency hopping technology means that carrier frequencies used by two devices (assumed to be a primary device and a secondary device) that perform short-distance wireless communication hop (in other words, a used radio channel changes regularly) according to a rule within a range in a communication process. During implementation, a frequency hopping map is used between the primary device and the secondary device (the frequency hopping map is usually designed for the primary device). The frequency hopping map indicates at least one available channel in operating channels between the primary device and the secondary device in a current case. The primary device and the secondary device randomly select, within a period of time, an available channel from these available channels for communication. In application, the primary device usually designs the frequency hopping map based on a channel quality assessment result obtained by the primary device and a channel quality assessment result reported by the secondary device. However, in the conventional technology, the channel quality assessment result reported by the secondary device is unable to accurately indicate a channel quality of a channel between the primary device and the secondary device, and the channel quality assessment result is reported. Consequently, flexibility of channel quality reporting is poor.

SUMMARY

To resolve the foregoing problem, some embodiments provide a communication method and apparatus in a wireless communication system, to adaptively report channel quality at different precision. This improves flexibility of channel quality reporting.

Some embodiments provide a communication method in a wireless communication system. The method includes A first terminal device receives first channel quality reporting information sent by a second terminal device. Herein, a format of the first channel quality reporting information is one of at least two preset formats. The first channel quality reporting information includes a channel quality parameter of at least one target channel determined by the second terminal device. The at least one target channel is a radio channel between the first terminal device and the second terminal device. A channel quality parameter corresponding to any target channel indicates channel quality of the target channel The first terminal device parses the first channel quality reporting information, to obtain the channel quality parameter of the at least one target channel.

In some embodiments, the first terminal device receives first channel quality reporting information that is adaptively reported by the second terminal device in different formats, to obtain a channel quality parameter of each target channel with appropriate precision. This improves effectiveness of channel quality reporting.

In some embodiments, the first terminal device updates a first frequency hopping map based on the channel quality parameter of the at least one target channel. The first frequency hopping map is used by the first terminal device to determine at least one available channel between the first terminal device and the second terminal device. The first terminal device updates the first frequency hopping map based on the channel quality parameter of the at least one target channel with appropriate precision, to obtain a more accurate first frequency hopping map. This improves an anti-interference capability of a frequency hopping technology.

In some embodiments, the first terminal device sends a channel quality assessment request to the second terminal device. Herein, the channel quality assessment request includes reporting mode indication information, and the reporting mode indication information indicates a format of the first channel quality reporting information sent by the second terminal device. The channel quality assessment request is used for requesting the second terminal device to report first channel quality reporting information in a format. The first terminal device triggers, in a timely manner by using a channel quality report request, the second terminal device to report the first channel quality reporting information. This ensures timeliness of the first channel quality reporting information. Further, the first terminal device updates the first frequency hopping map in a timely manner based on the first channel quality reporting information. This improves timeliness and accuracy of the first frequency hopping map.

In some embodiments, the channel quality assessment request further includes a first time interval and a second time interval, and the second time interval is greater than the first time interval. The reporting mode indication information further indicates that the second terminal device sends the first channel quality reporting information within the first time interval. Alternatively, the reporting mode indication information further indicates that the second terminal device sends the first channel quality reporting information within the second time interval. Alternatively, the reporting mode indication information further indicates that the second terminal device sends the first channel quality reporting information within the second time interval by using the first time interval as a sending interval.

In some embodiments, the channel quality assessment request further includes a target moment. The reporting mode indication information further indicates that the second terminal device sends the first channel quality reporting information at the target moment or before the target moment.

The first terminal device may explicitly indicate, by using the reporting mode indication information, that the second terminal device sends the first channel quality reporting information at a time (for example, at the target moment or within the first time interval). This ensures effectiveness of the first channel quality reporting information.

In some embodiments, the at least one available channel indicated by the first frequency hopping map is the same as the at least one target channel indicated by target channel indication information, and the reporting mode indication information further indicates that the second terminal device updates a second frequency hopping map based on the at least one target channel The second frequency hopping map is used by the second terminal device to determine the at least one available channel between the first terminal device and the second terminal device. This is equivalent to that the first terminal device reuses the first frequency hopping map and the target channel indication information, so that the first terminal device is unable to indicate, by using the target channel indication information, the second terminal device to report the channel quality parameter of the at least one target channel, but further notify the second terminal device that the at least one target channel is further the available channel determined by the second terminal device, so that the second terminal device updates the second frequency hopping map based on the at least one target channel. In this way, the first terminal device does not call to separately send a first frequency hopping map to trigger the second terminal device to update the second frequency hopping map. This reduces communication resources between the first terminal device and the second terminal device.

In some embodiments, before the first terminal device sends the channel quality assessment request to the second terminal device, the method further includes: The first terminal device receives second channel quality reporting information from the second terminal device. The first terminal device determines at least one first channel indicated by the second channel quality indication information. Herein, a channel quality parameter of the first channel is less than or equal to a first preset parameter. Alternatively, a channel quality parameter of the first channel is greater than a channel quality parameter of a channel other than the first channel in channels indicated by the second channel quality reporting information. The first terminal device determines the at least one available channel indicated by the first frequency hopping map. The first terminal device determines a first quantity of channels that do not coexist in the at least one available channel and the at least one first channel. The first terminal device determines, based on the first quantity, to perform an operation of sending the channel quality assessment request to the second terminal device by the first terminal device. The first terminal device determines, based on a difference between the at least one available channel indicated by the current first frequency hopping map of the first terminal device and the at least one first channel whose channel quality is good and that is determined by the second terminal device, whether to send the channel quality assessment request to the second terminal device. The method is implemented, so that the first terminal device sends the channel quality assessment request to the second terminal device in response to finding that the first frequency hopping map currently used by the first terminal device is inaccurate. This ensures appropriateness and effectiveness of the channel quality assessment request.

In some embodiments, after obtaining an updated first frequency hopping map, the first terminal device sends the updated first frequency hopping map to the second terminal device, so that the second terminal device updates the second frequency hopping map based on the updated first frequency hopping map. Herein, the second frequency hopping map is used by the second terminal device to determine the at least one available channel between the first terminal device and the second terminal device.

Some embodiments provide a communication method in a wireless communication system. The method includes: A second terminal device determines first channel quality reporting information. Herein, a format of the first channel quality reporting information is one of at least two preset formats, the first channel quality reporting information includes a channel quality parameter of at least one target channel determined by the second terminal device, and the target channel is a radio channel between the second terminal device and a first terminal device. The second terminal device sends the first channel quality reporting information to the first terminal device.

In some embodiments, the second terminal device may adaptively provide channel quality parameters with different precision for the first terminal device by using first channel quality reporting information in different formats. This improves flexibility of channel quality reporting.

In some embodiments, the first channel quality reporting information is used by the first terminal device to update a first frequency hopping map, and the first frequency hopping map is used by the first terminal device to determine at least one available channel between the first terminal device and the second terminal device. A channel quality parameter with appropriate precision is provided for the first terminal device, so that the first terminal device updates the first frequency hopping map based on the channel quality parameter with the appropriate precision, to obtain a more accurate first frequency hopping map. This improves an anti-interference capability of a frequency hopping technology.

In some embodiments, before the second terminal device sends the first channel quality reporting information to the first terminal device, the second terminal device receives a channel quality assessment request from the first terminal device. Herein, the channel quality assessment request includes reporting mode indication information, and the reporting mode indication information indicates a format of the first channel quality reporting information. The channel quality assessment request is used for requesting the second terminal device to send first channel quality reporting information in a format. Herein, the second terminal device sends the first channel quality reporting information after receiving the channel quality assessment request sent by the first terminal device. This avoids a case in which the first terminal sends the first channel quality reporting information to the first terminal device in response to the first terminal having no condition, and avoids waste of communication resources between the first terminal device and the second terminal device.

In some embodiments, the channel quality assessment request further includes a first time interval or a second time interval, and the second time interval is greater than the first time interval. The second terminal device determines the first time interval or the second time interval based on the reporting mode indication information. The second terminal device sends the first channel quality reporting information to the first terminal device within the first time interval or the second time interval.

In some embodiments, the channel quality assessment request includes a first time interval and a second time interval, and the second time interval is greater than the first time interval. The second terminal device determines the first time interval and the second time interval based on the reporting mode indication information. The second terminal device sends the first channel quality reporting information to the first terminal device within the second time interval by using the first time interval as a sending interval. Alternatively, the second terminal device sends first channel quality reporting information to the second terminal device for a plurality of times within the second time interval, and a sending interval between each two pieces of first channel quality reporting information is to be equal to or less than the first time interval.

In some embodiments, the channel quality report request includes a target moment. The second terminal device determines the target moment based on the reporting mode indication information. The second terminal device sends the first channel quality reporting information to the first terminal device before the target moment or at the target moment.

In some embodiments, the second terminal device determines the at least one target channel based on target channel indication information. The second terminal device performs channel quality assessment on the at least one target channel to obtain a channel quality parameter of each target channel in the at least one target channel The second terminal device generates, based on the channel quality parameter of the target channel, first channel quality reporting information in a format indicated by the reporting mode indication information.

In some embodiments, the second terminal device determines the at least one available channel based on a second frequency hopping map. Herein, the second frequency hopping map is used by the second terminal device to determine the at least one available channel between the first terminal device and the second terminal device. The second terminal device performs channel quality assessment on channels between the second terminal device and the first terminal device, to obtain channel quality parameters of the channels. The second terminal device determines at least one second channel from the channels based on the channel quality parameters of the channels. Herein, a channel quality parameter of the second channel is less than or equal to a second preset parameter, or the channel quality parameter of the second channel is greater than a channel quality parameter of a channel other than the second channel in the channels. The second terminal device determines a second quantity of channels that do not coexist in the at least one available channel and the at least one second channel The first terminal device determines, based on the second quantity, to perform an operation of determining the first channel quality reporting information by the second terminal device. The second terminal device determines, based on a difference between the at least one available channel indicated by the current second frequency hopping map of the second terminal device and the at least one second channel whose channel quality is good and that is determined by the second terminal device through channel quality assessment, whether to actively send the first channel quality reporting information to the first terminal device. In addition, in response to finding that there is a large difference between the at least one available channel and the at least one second channel (in other words, in response to finding that the second frequency hopping map is inaccurate), the second terminal device actively sends first channel quality to the first terminal device, to trigger, in a timely manner, the first terminal device to adjust the first frequency hopping map. This ensures accuracy of the first frequency hopping map and the second frequency hopping map, and improve an anti-interference capability of a frequency hopping technology.

In some embodiments, the second terminal device receives an updated first frequency hopping map sent by the first terminal device. Then, the second terminal device updates the second frequency hopping map based on the updated first frequency hopping map.

Some embodiments provide a communication apparatus in a wireless communication system. The communication apparatus is a first terminal device or a chip in the first terminal device, for example, a Bluetooth chip. The communication apparatus includes:

a transceiver unit, configured to receive first channel quality reporting information from a second terminal device, where a format of the first channel quality reporting information is one of at least two preset formats, the first channel quality reporting information includes a channel quality parameter of at least one target channel determined by the second terminal device, and the target channel is a radio channel between the second terminal device and the first terminal device; and a processing unit, configured to update a first frequency hopping map based on the first channel quality reporting information, where the first frequency hopping map is used by the first terminal device to determine at least one available channel between the first terminal device and the second terminal device.

Some embodiments provide a communication apparatus in a wireless communication system. The communication apparatus is a second terminal device or a chip in the second terminal device, for example, a Bluetooth chip. The communication apparatus includes:

a processing unit, configured to determine first channel quality reporting information, where a format of the first channel quality reporting information is one of at least two preset formats, the first channel quality reporting information includes a channel quality parameter of at least one target channel determined by the second terminal device, and the target channel is a radio channel between the second terminal device and a first terminal device; and a transceiver unit, configured to send the first channel quality reporting information to the first terminal device, where the first channel quality reporting information is used by the first terminal device to update a first frequency hopping map, and the first frequency hopping map is used by the first terminal device to determine at least one available channel between the first terminal device and the second terminal device.

In some embodiments, precision of channel quality parameters included in first channel quality reporting information in different formats is different. In other words, quantization precision of quantization rules used for the first channel quality reporting information in different formats is different. Higher quantization precision of a quantization rule indicates more levels corresponding to a channel quality parameter obtained through quantization, and the channel quality parameter indicates more accurate channel quality. For example, in response to a channel quality parameter obtained through quantization based on a quantization rule A having two levels: good and poor, the channel quality parameter indicates channel quality at the two levels: good and poor. However, a channel quality parameter obtained through quantization based on a quantization rule B has four levels: extremely good, relatively good, relatively poor, and extremely poor. In this case, the channel quality parameter indicates channel quality at the four levels. Therefore, first channel quality reporting information based on the quantization rule B more accurately indicates channel quality. Herein, a plurality of formats with different precision of channel quality parameters are set for the first channel quality reporting information, so that flexibility of channel quality reporting is improved. Further, the first terminal device further is enabled to obtain, based on the first channel quality reporting information in different formats, channel quality parameters with different precision provided by the second terminal device, so that the first device subsequently obtains a more appropriate and accurate first frequency hopping map through update.

In some embodiments, the channel quality assessment request further includes target channel indication information, and the target channel indication information indicates the at least one target channel. In other words, the first terminal device specifies a channel quality parameter of at least one target channel called for by the second terminal device to be determined and reported by the second terminal device. On one hand, the second terminal device does not call to determine channel quality parameters of channels. This reduces a data processing amount of the second terminal device. On the other hand, the first terminal device does not call to subsequently extract a channel quality parameter from another channel other than the target channel. This further reduces a data processing amount of the first terminal device.

Some embodiments provide a communication apparatus, which is specifically a first terminal device. The first terminal device has a function of implementing behavior of the first terminal device in the foregoing method. The function is implemented by hardware, or is implemented by hardware executing responding software. The hardware or the software includes one or more modules corresponding to the foregoing function.

In some embodiments, the first terminal device includes a processor and a transceiver. The processor is configured to support the first terminal device in performing a corresponding function in the foregoing method. The transceiver is configured to: support communication between the first terminal device and a second terminal device, and send information, a data packet, or instructions to the second terminal device or receive information, a data packet, or instructions from the second terminal device in the foregoing method. The first terminal device further includes a memory. The memory is configured to be coupled to the processor, and the memory stores program instructions and data that are for the first terminal device.

Some embodiments provide a communication apparatus, which is specifically a second terminal device. The second terminal device has a function of implementing behavior of the second terminal device in the foregoing method. The function is implemented by hardware, or is implemented by hardware executing responding software. The hardware or the software includes one or more modules corresponding to the foregoing function.

In some embodiments, the second terminal device includes a processor and a transceiver. The processor is configured to support the second terminal device in performing a corresponding function in the foregoing method. The transceiver is configured to: support communication between the second terminal device and a first terminal device, and send information, a data packet, or instructions to the first terminal device or receive information, a data packet, or instructions from the first terminal device in the foregoing method. The second terminal device further includes a memory. The memory is coupled to the processor, and the memory stores program instructions and data that are for the second terminal device.

Some embodiments provide a communication system. The communication system includes the at least one first terminal device and the at least one second terminal device described in the foregoing embodiments.

Some embodiments provide a chip or a chip system, including an input/output interface and a processing circuit. The input/output interface is used for information or data exchange, and the processing circuit is configured to run instructions, so that an apparatus mounted in the chip or the chip system performs the method according to any one of the foregoing embodiments.

Some embodiments provide a computer-readable storage medium. The computer-readable storage medium stores instructions, and the instructions are executed by one or more processors on a processing circuit. In response to the computer-readable storage medium being run on a computer, the computer is enabled to perform the method in any one of the foregoing embodiments.

Some embodiments provide a computer program product that includes instructions. In response to the computer program product running on a computer, the computer is enabled to perform the method in any one of the foregoing embodiments.

Some embodiments provide a chip system. The chip system includes a processor, configured to support an apparatus mounted in the chip system in implementing the method in any one of the foregoing embodiments, for example, generating or processing data and/or information in the foregoing methods. In some embodiments, the chip system further includes a memory, and the memory is configured to store program instructions and data that are for a data sending device. The chip system includes a chip, or includes a chip and another discrete component.

DESCRIPTION OF EMBODIMENTS

The following clearly and completely describes the technical solutions in the embodiments with reference to the accompanying drawings in the embodiments.

Some embodiments provide a communication method. The method is applicable to various communication systems in which wireless communication is performed by using a short-range wireless communication technology combined with a frequency hopping technology (such as an adaptive frequency hopping (AFH) technology). Herein, the short-range wireless communication technology includes but is not limited to a Bluetooth technology, a wireless Internet access (wireless fidelity, Wi-Fi) technology, a ZigBee (namely, ZigBee) technology, an 802.15.4 protocol, and the like.

A first terminal device or a second terminal device in some embodiments are user equipment, a mobile device, a user terminal, a terminal, or a short-range wireless communication device, or is a handheld device or a computing device with a short-range wireless communication function, another processing device connected to a wireless modem, a wearable device, or the like. This is not limited in some embodiments. For ease of understanding, in some embodiments, the first terminal device or the second terminal device is used for unified description.

Figure 1:
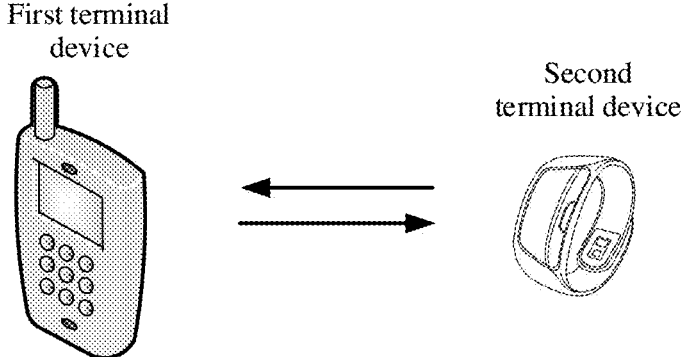
FIG. 1 is a schematic diagram of a structure of a communication system according to some embodiments.

FIG. 1 is a schematic diagram of a structure of a communication system according to some embodiments. From FIG. 1 the communication system mainly includes a first terminal device and a second terminal device. Herein, the first terminal device and the second terminal device exchange information based on a short-range wireless communication technology such as Bluetooth. In application, because the Bluetooth technology, a Wi-Fi technology, and a ZigBee technology work in an ISM 2.4 GHz frequency band, strong signal interference exists between devices that simultaneously use these short-distance wireless communication technologies in a same environment. For example, in some embodiments, in response to data transmission being performed between the first terminal device and the second terminal device by using Bluetooth, the first terminal device further performs data transmission with a third terminal device by using Wi-Fi. In response to a frequency of a channel used between the first terminal device and the second terminal device being the same as or close to a frequency of a channel used between the first terminal device and the third terminal device, mutual interference is easily caused between communication between the first terminal device, the second terminal device, and the third terminal device. Consequently, communication quality between the first terminal device, the second terminal device, and the third terminal device is reduced. To resolve this problem, people put forward a frequency hopping technology. The frequency hopping technology means that carrier frequencies used by two devices (for example, the first terminal device and the second terminal device) that perform short-distance wireless communication hop (in other words, a used radio channel changes regularly) according to a rule within a range in a communication process. During implementation, a frequency hopping map is used between the first terminal device and the second terminal device. The frequency hopping map indicates one or more available channels with good channel quality between the first terminal device and the second terminal device in a current case. The first terminal device and the second terminal device randomly select, within a period of time, an available channel from these available channels for communication. By using the frequency hopping map, the first terminal device and the second terminal device avoids a problem of poor communication quality caused by using a channel occupied by another device to perform communication. Because the frequency hopping map directly indicates the available channels, one factor that determines anti-interference performance of the frequency hopping technology is accuracy of the frequency hopping map.

In some embodiments, generally, a device for designing a frequency hopping map is referred to as a primary device, and another device that uses the frequency hopping map is referred to as a secondary device. In some embodiments, the first terminal device is a primary device, and the second terminal device is a secondary device. The first terminal device usually performs channel assessment on a channel between the first terminal device and the second terminal device, to obtain a channel quality assessment result (herein, in some embodiments, the channel quality assessment result is a first channel quality assessment result). The second terminal device further evaluates the channel, to obtain a channel quality assessment result (herein, in some embodiments, the channel quality assessment result is a second channel quality assessment result), and reports the channel quality assessment result to the first terminal device. Then, the first terminal device may design a new frequency hopping map based on the first channel quality assessment result and the second channel quality assessment result, for use by the first terminal device and the second terminal device. However, in the conventional technology, the second channel quality assessment result reported by the second terminal device is unable to accurately indicate channel quality of the channel in detail (for example, an assessment result of each channel in the channel quality assessment result reported by the second terminal device includes good or poor), and a form of reporting the channel quality assessment result is effective. Consequently, flexibility of channel quality reporting is low.

Therefore, according to the method in some embodiments, channel quality information is reported in different formats with different precision. This improves flexibility of channel quality reporting. Further, the reported channel quality information is used by the first terminal device to update the frequency hopping map, so that accuracy of the frequency hopping map designed for the first terminal device is improved, and an anti-interference capability of the frequency hopping technology is improved.

To facilitate understanding and description of some embodiments, the following first describes related concepts in some embodiments.

1. Frequency Hopping Map

Figure 2:
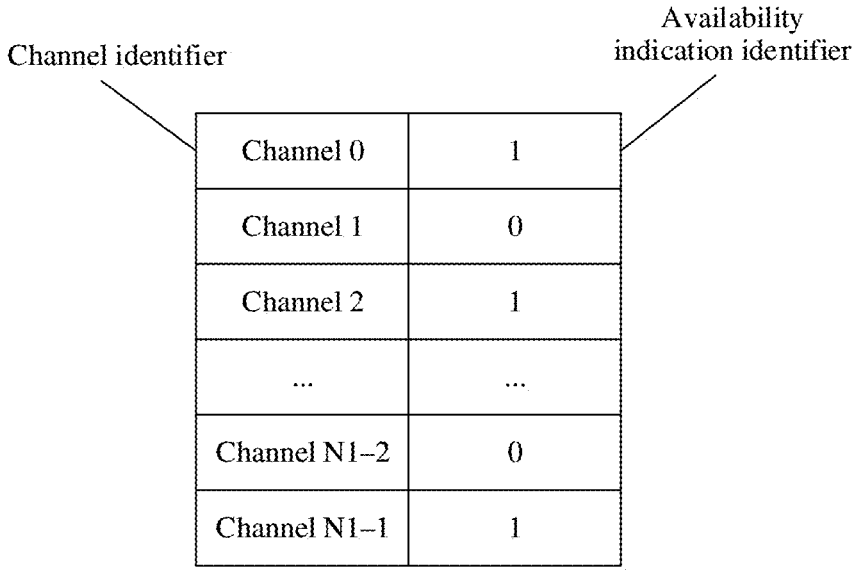
FIG. 2 is a schematic diagram of a frequency hopping map according to some embodiments.

In application, the frequency hopping map indicates which channels are available channels and which channels are unavailable channels in a plurality of channels between two terminal devices. The two terminal devices share a same frequency hopping map. FIG. 2 is a schematic diagram of a frequency hopping map according to some embodiments. In some embodiments, there are N1 channels between a first terminal device and a second terminal device. Herein, N1 is a positive integer. Each channel corresponds to one channel identifier, and a channel number is used as a channel identifier of each channel in the following description. For example, the N1 channels includes a plurality of channels identified as a channel 0, a channel 1, and a channel 2. FIG. 2 is a schematic diagram of a frequency hopping map according to some embodiments. As shown in FIG. 2, the frequency hopping map includes a channel identifier of each of the N1 channels and an availability indication identifier corresponding to each channel. In some embodiments, the availability indication identifier has two values: 0 and 1. In response to the availability indication identifier being 0, a corresponding channel is an unavailable channel. In response to the value of the availability indication identifier being 1, a corresponding channel is an available channel. As shown in FIG. 2, the frequency hopping map indicates that a channel 0, a channel 2, and a channel N1−1 are available channels, and a channel 1 and a channel N1−2 are unavailable channels.

Figure 3A:
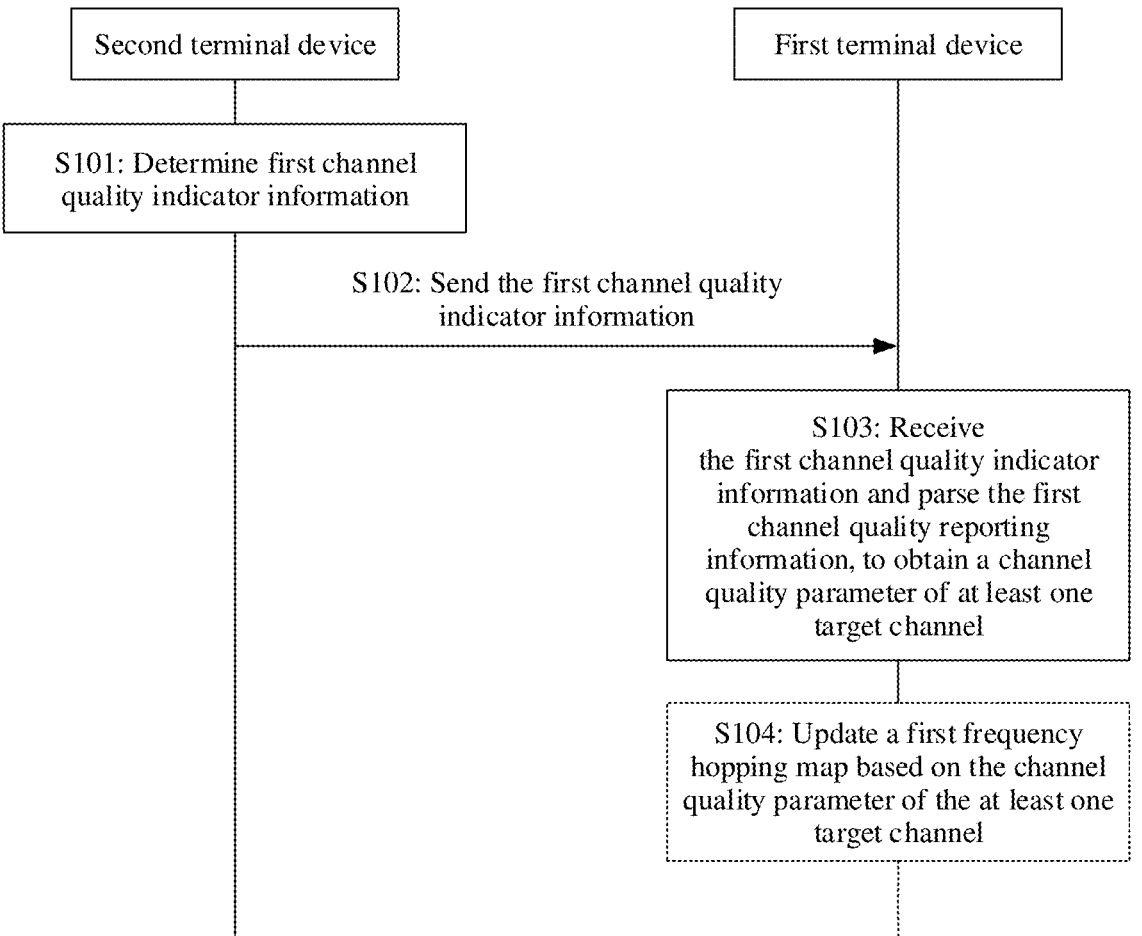
FIG. 3a is a schematic flowchart of a communication method according to some embodiments.

FIG. 3a is a schematic flowchart of a communication method according to some embodiments. As shown in FIG.

3a, the communication method provided in some embodiments includes but is not limited to the following steps.

S101: A second terminal device determines first channel quality reporting information.

S102: The second terminal device sends first channel quality reporting information to a first terminal device.

S103: The first terminal device receives and parses the first channel quality reporting information, to obtain a channel quality parameter of at least one target channel.

Optionally, S104: The first terminal device updates a first frequency hopping map based on the channel quality parameter of the at least one target channel. In some embodiments, the first terminal device may alternatively use the channel quality parameter of the at least one target channel for another purpose. This is not specifically limited in some embodiments.

In some feasible implementations, after determining that the second terminal device is to report channel quality to the first terminal device, the second terminal device obtains one or more of the foregoing N1 channels (for ease of understanding and differentiation, the one or more channels are replaced with N2 target channels below for description, where N2 is an integer greater than or equal to 1).

Some embodiments provide at least four formats of the first channel quality reporting information. The following briefly describes the first channel quality reporting information in each format.

Format 1:

First channel quality reporting information in a format 1 includes channel quality parameters of channels between the first terminal device and the second terminal device (in other words, a quantity N2 of target channels is equal to N1). Herein, the channel quality parameters correspond to at least three quantized values: a first quantized value, a second quantized value, and a third quantized value. A channel quality parameter of the first quantized value indicates that channel quality of a corresponding channel is unknown. A channel quality parameter of the second quantized value indicates that channel quality of a corresponding channel is good, and a channel quality parameter of the third quantized value indicates that channel quality of a corresponding channel is poor. In the N1 target channels, a channel 2n and a channel 2n+1 share a same channel quality parameter. Herein, n is a positive integer greater than or equal to 0 and less than or equal to (N1−1)/2. In some embodiments, the first channel quality reporting information in the format 1 includes n+1 channel quality parameters, indicating whether channel quality of each of the N1 target channels is good or poor.

Format 2:

First channel quality reporting information in a format 2 further includes channel quality parameters of channels between the first terminal device and the second terminal device. Herein, the channel quality parameters correspond to two quantized values: a first quantized value and a second quantized value. A channel quality parameter of the first quantized value indicates that channel quality of a corresponding channel is good, and a channel quality parameter of the second quantized value indicates that channel quality of a corresponding channel is poor. In the first channel quality reporting information in the format 2, one target channel corresponds to one channel quality parameter. In other words, an $n^{th}$ channel quality parameter indicates channel quality of a channel n. Herein, n is a positive integer greater than or equal to 0 and less than or equal to N1−1. In some embodiments, the first channel quality reporting information in the format 2 includes N1 channel quality parameters, indicating whether channel quality of each of the N1 target channels is good or poor.

Format 3:

First channel quality reporting information in a format 3 includes channel quality parameters of a part of channels between the first terminal device and the second terminal device (in other words, N2 is less than N1). Herein, the channel quality parameters correspond to four quantized values: a first quantized value, a second quantized value, a third quantized value, and a fourth quantized value. A channel quality parameter of the first quantized value indicates that channel quality of a corresponding channel is unknown. A channel quality parameter of the second quantized value indicates that channel quality of a corresponding channel is good, and a channel quality parameter of the third quantized value indicates that channel quality of a corresponding channel is applicable (or medium), and a channel quality parameter of the fourth quantized value indicates that channel quality of a corresponding channel is poor. In the N2 target channels, one target channel corresponds to one channel quality parameter. In other words, an $n^{th}$ channel quality parameter indicates channel quality of a channel n. Herein, n is a positive integer greater than or equal to 0 and less than or equal to N2−1. In some embodiments, the first channel quality reporting information in the format 3 includes N2 channel quality parameters corresponding to the N2 target channels, and the N2 channel quality parameters indicate that channel quality of the N2 target channels is good, applicable, or poor.

Format 4:

First channel quality reporting information in a format 4 includes channel quality parameters of a part of channels between the first terminal device and the second terminal device (in other words, N2 is less than N1). In this format, the channel quality parameters correspond to five or more quantized values, and channel quality parameters of different quantized values indicate different channel quality of corresponding channels. In the first channel quality reporting information in the format 4, one target channel corresponds to one channel quality parameter. In other words, an $n^{th}$ channel quality parameter indicates channel quality of a channel n. Herein, n is a positive integer greater than or equal to 0 and less than or equal to N2−1. In some embodiments, the first channel quality reporting information in the format 4 includes N2 channel quality parameters, and each channel quality parameter indicates channel quality of a target channel at five or more levels.

In some embodiments, as shown in the foregoing four formats, in response to the quantity of target channels indicated in the first channel quality reporting information or quantization precision of a channel quality parameter of each target channel being different, more formats of the first channel quality reporting information is provided in some embodiments. Details are not described herein again.

The following further describes implementations of the first channel quality reporting information in the foregoing four formats with reference to a Bluetooth (basic rate/enhanced data rate, BR/EDR) version. In application, in the Bluetooth BR/EDR version there are 79 channels between the first terminal device and the second terminal device.

TABLE 1-1

| | Field length (Byte) | Format | Data format |
|---|---|---|---|
| Field name | | | |
| First channel quality reporting information | 10 | Format 1 | u_int2[40], namely, an integer array containing 40 elements |
| | | Format 2 | u_int[80], namely, an integer array containing 80 elements |
| | | Format 3 | u_int2[40], namely, an integer array containing 40 elements |
| | | Format 4 | u_int2[20], namely, an integer array containing 20 elements |

Refer to the table 1-1. The table 1-1 is a format comparison table of the first channel quality reporting information according to some embodiments. As shown in the table 1-1, a field length of the first channel quality reporting information in the format 1 is 10 bytes. The first channel quality reporting information is specifically an integer array including 40 elements (namely, elements 0 to 39). One element corresponds to one channel quality parameter. The $n^{th}$ channel quality parameter indicates channel quality of the channel $2n$ and the channel $2n+1$, and a $39^{th}$ channel quality parameter indicates channel quality of a channel 79. Herein, each channel quality parameter occupies 2 bits, which may have four values: 0, 1, 2, and 3. For example, 0 is the first quantized value in the format 1 described above, 1 is the second quantized value, and 3 is the third quantized value. A value of 2 of the 2 bits are used as a reserved value for future design. In response to values of the 2 bits being 0, the channel quality parameter indicates that channel quality of a channel is unknown. In response to values of the 2 bits being 1, the channel quality parameter indicates that channel quality of a channel is good. In response to values of the 2 bits being 3, the channel quality parameter indicates that channel quality of a channel is poor.

A field length of the first channel quality reporting information in the format 2 is 10 bytes. The first channel quality reporting information is specifically an integer array including 80 elements (namely, elements 0 to 79). One element corresponds to one channel quality parameter. The $n^{th}$ channel quality parameter indicates the channel quality of the channel n, and a $79^{th}$ element is used as a reserved element for future design. Herein, each channel quality parameter occupies 1 bit, which have two values in total: 0 and 1. For example, 1 is the first quantized value in the format 2 described above, and 0 is the second quantized value. In response to a value of the bit being 0, the channel quality parameter indicates that channel quality of a channel is poor. In response to a value of the bit being 1, the channel quality parameter indicates that channel quality of a channel is good.

A field length of the first channel quality reporting information in the format 3 is 10 bytes. The first channel quality reporting information is specifically an integer array including 40 elements (namely, elements 0 to 39), which correspondingly indicates channel quality of 40 channels in the 79 channels. One element corresponds to one channel quality parameter. The nth channel quality parameter indicates channel quality of the $n^{th}$ channel in the foregoing 40 channels. Herein, each channel quality parameter occupies 2 bits, which have four values in total: 0, 1, 2, and 3. For example, 0 is the first quantized value in the foregoing format 3 described above, 1 is the second quantized value, 3 is the third quantized value, and 4 is the fourth quantized value. In response to values of the 2 bits being 0, the channel quality parameter indicates that channel quality of a channel is unknown. In response to values of the 2 bits being 1, the channel quality parameter indicates that channel quality of a channel is good. In response to values of the 2 bits being 2, the channel quality parameter indicates that channel quality of a channel is applicable. In response to values of the 2 bits being 3, the channel quality parameter indicates that channel quality of a channel is poor.

A field length of the first channel quality reporting information in the format 4 is 10 bytes. The first channel quality reporting information is specifically an integer array including 20 elements (namely, elements 0 to 19), which correspondingly indicates channel quality of 20 channels in the 79 channels. One element corresponds to one channel quality parameter. The nth channel quality parameter indicates channel quality of the $n^{th}$ channel in the foregoing 20 channels. Herein, each channel quality parameter occupies 4 bits, which have 16 values in total. The 16 values correspond to 16 quantized values of channel quality parameters in the format 4 described above. For example, in response to values of the 4 bits being 0, the channel quality parameter indicates that channel quality of a channel is unknown. Remaining 15 values (including 1 to 15) indicate channel quality of channels at 15 levels.

Optionally, during implementation, the first channel quality reporting information is carried in a CQI-res packet recorded in the Bluetooth BR/EDR version. Herein, a packet length of the CQI-res packet carrying the first channel quality reporting information is 12 bytes or 13 bytes. In response to the CQI_res packet having 12 bytes, a channel_quality_index field in the CQI_res packet is used as first channel quality reporting information in any one of the foregoing formats. In response to the CQI_res packet having 13 bytes, a channel_quality_index field in the CQI_res packet is used as first channel quality reporting information in any one of the foregoing formats, and a CQI_req_format field in the CQI_res packet indicates format indication information of a format of the first channel quality reporting information. The format indication information is specifically a first format identifier, a second format identifier, a third format identifier, or a fourth format identifier, which indicate the format 1, the format 2, the format 3, or the format 4 respectively.

Herein, the second terminal device may provide channel quality parameters of different precision for the first terminal device by using the first channel quality reporting information in the format 2, the format 3, or the format 4. This improves flexibility of channel quality reporting.

The following describes in detail a process in which the second terminal device generates the first channel quality reporting information with reference to the foregoing four formats and two scenarios. The scenarios include: The second terminal device actively reports the first channel quality reporting information or the second terminal device reports the first channel quality reporting information based on a request of the first terminal device.

Scenario 1 (The Second Terminal Device Actively Reports the First Channel Quality Reporting Information):

The second terminal device first performs channel quality measurement on each of the N1 channels, to obtain a channel quality measurement value corresponding to each channel. During implementation, the second terminal device performs full-band scanning, to obtain received signal strength of each of the foregoing channels, and use the received signal strength of each channel as the channel quality measurement value of the channel. In addition, the second terminal device alternatively determines parameters such as reference signal received power and a signal to interference plus noise ratio of each channel as the channel quality measurement value of the channel. This is not specifically limited in some embodiments.

Figure 3B:
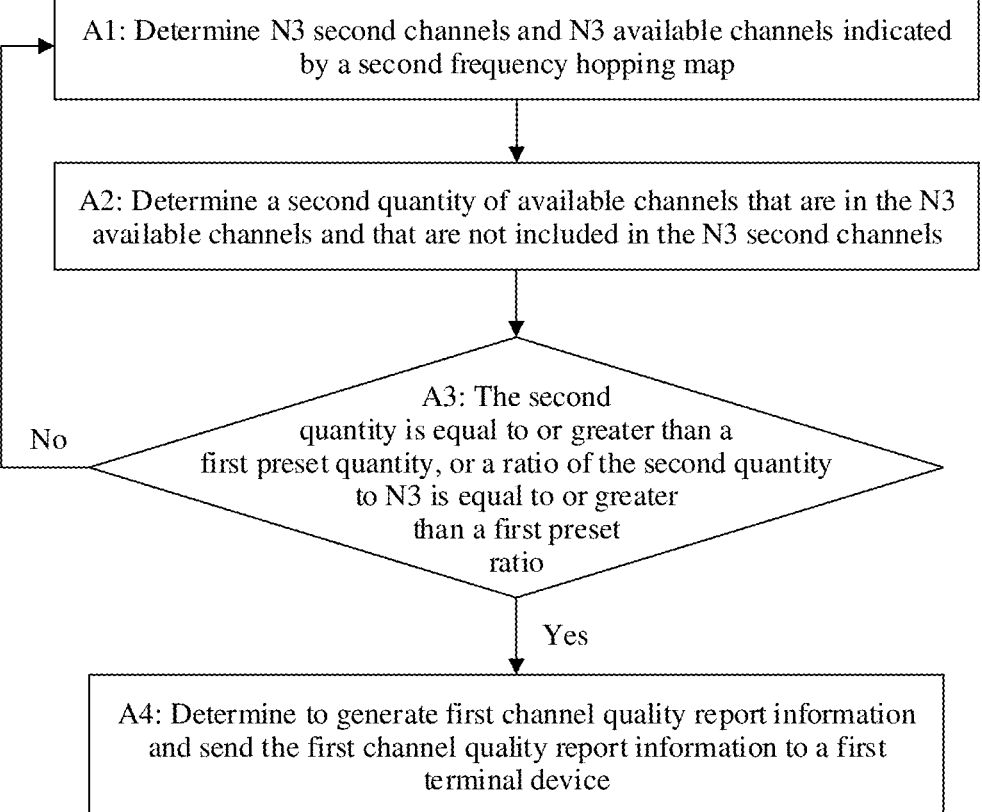
FIG. 3b is a schematic flowchart of determining a trigger condition according to some embodiments.

In an optional implementation, the second terminal device determines, based on at least one available channel indicated by a second frequency hopping map used by the second terminal device and at least one second channel, whether the second terminal device is to actively generate the first channel quality reporting information and send the first channel quality reporting information to the first terminal device. Herein, the second channel is determined by the second terminal device from the N1 channels based on the channel quality measurement value of each channel. The second frequency hopping map is used by the second terminal device to determine which channels are available and which channels are unavailable between the second terminal device and the first terminal device. In response to the first frequency hopping map not being updated, the first frequency hopping map and the second frequency hopping map are the same. Specifically, refer to FIG. 3b. FIG. 3b is a schematic flowchart of determining a trigger condition according to some embodiments. As shown in FIG. 3b, A1: The second terminal device determines, based on an availability indication identifier corresponding to each channel in the second frequency hopping map, one or more available channels (herein, in some embodiments, there are N3 available channels, and N3 is a positive integer) indicated by the second frequency hopping map. Then, the second terminal device further determines, from the N1 channels, N3 second channels whose channel quality measurement values are greater than or equal to a second preset measurement value. In some embodiments, in response to a quantity of channels whose channel quality measurement values are greater than or equal to the second preset measurement value in the N1 channels being greater than N3, redundant channels are randomly removed. In response to the quantity of channels whose channel quality measurement values being greater than or equal to the second preset measurement value in the N1 channels is less than N3, a plurality of channels are randomly selected from remaining channels that do not meet the condition as second channels, so that a quantity of second channels is equal to N3. Alternatively, the second terminal device sorts the N1 channels based on channel quality measurement values, and extract N3 channels that rank top as N3 second channels. In other words, channel quality measurement values of the second channels are greater than a channel quality measurement value of a channel other than the second channels in the N1 channels. A2: The second terminal device determines a quantity of available channels that are in the N3 available channels and that are not included in the N3 second channels (for ease of differentiation, the quantity is replaced with a second quantity below for description). A3: The second terminal device determines, based on the second quantity, whether to generate the first channel quality reporting information and send the first channel quality reporting information to the first terminal device. For example, the second terminal device determines whether the second quantity is greater than or equal to a first preset quantity. Alternatively, the second terminal device calculates a ratio (which is assumed to be D1 herein) of the second quantity to the quantity N3 of channels, and determine whether D1 is greater than or equal to a first preset ratio. A4: In response to the second terminal device determining that the second quantity is greater than or equal to the first preset quantity, or determines that D1 is greater than or equal to the first preset ratio, the second terminal device determines to generate the first channel quality reporting information and send the first channel quality reporting information to the first terminal device. In response to the second terminal device determining that the second quantity is less than the first preset quantity or D1 is less than the first preset ratio, the second terminal device determines that the second terminal device does not call to generate the first channel quality reporting information this time, and the second terminal device repeatedly perform an operation of A1. For example, the N3 available channels include a channel 0, a channel 1, a channel 2, and a channel 3. The N3 second channels include the channel 2, the channel 3, a channel 4, and a channel 5. The second terminal device determines that the channel 0 and the channel 1 in the N3 available channels are not included in the N3 second channels, that is, the second quantity is 2. Then, in response to the first preset quantity being 1, the second terminal device determines that the second quantity is greater than the first preset quantity, so that the second terminal device determines that the second terminal device is to generate the first channel quality reporting information and send the first channel quality reporting information to the first terminal device. Alternatively, in some embodiments, the first preset ratio is 0.3. The second terminal device calculates a ratio of the second quantity to N3 is $D1=1/2=0.5$. Then, the second terminal device determines that D1 is greater than the first preset ratio, and determines that the second terminal device is to generate the first channel quality reporting information and send the first channel quality reporting information to the first terminal device.

If the second terminal device determines to send the first channel quality reporting information, the second terminal device first generates first channel quality reporting information in any one of the foregoing format 1, format 2, format 3, or format 4 based on the channel quality measurement value of each of the N1 channels. In some embodiments, a format of the first channel quality reporting information (for ease of understanding, the format is replaced with a target format below for description) is predetermined in a communication protocol between the first terminal device and the second terminal device, and the format 3 or the format 4 is selected. During implementation, the second terminal device selects N2 target channels from the N1 channels based on the target format of the to-be-generated first channel quality reporting information. For example, in response to the target format being the format 1 or the format 2, the N2 target channels are the N1 channels. in response to the target format being the format 3 or the format 4, the N2 target channels are N2 channels whose channel quality measurement values rank top or N2 channels whose channel quality measurement values rank bottom in the N1 channels. Then, the second terminal device may quantize the channel quality measurement values of the N2 target channels by using different quantization rules corresponding to different formats, to obtain channel quality parameters of the target channels. In some embodiments, different quantization rules correspond to different quantization precision. In other words, channel quality parameters in different formats correspond to different quantization levels. More quantization levels indicate higher quantization precision of the channel quality parameters. For example, quantization precision of channel quality parameters corresponding to the format 1 and the format 2 are the same. There are three quantization levels, which indicates that channel quality of a channel is good, poor, or unknown. Quantization precision of a channel quality parameter corresponding to the format 3 is higher than that of the format 1 and the format 2. A quantized value of the channel quality parameter corresponding to the format 3 has four levels, which indicates that channel quality of a channel is good, applicable, poor, or unknown. Quantization precision of a channel quality parameter corresponding to the format 4 is higher than that of the format 1, the format 2, and the format 3. A quantized value of the channel quality parameter corresponding to the format 4 has five or more levels, so that channel quality of each channel is more accurately indicated. Then, the second terminal device determines first channel quality reporting information in the target format based on the channel quality parameters of the target channels.

With reference to implementations of the four formats described in the table 1-1, the following describes processes in which the second terminal device generates first channel quality reporting information in different formats.

If the target format is the format 1, the second terminal device determines that the 79 channels between the first terminal device and the second terminal device are target channels. Then, the second terminal device performs quantization processing on channel quality measurement values of the 79 target channels one by one by using a quantization rule (for ease of understanding, the quantization rule is replaced with a first quantization rule below for description) corresponding to the format 1, to obtain channel quality parameters of the 79 target channels. Herein, the first quantization rule is specifically as follows: in response to a channel quality measurement value being 0 or null, a corresponding channel quality parameter is 0. In response to a channel quality parameter being greater than or equal to a first preset measurement value, a corresponding channel quality parameter is 1. In response to a channel quality parameter being greater than 0 and less than a first preset measurement value, a corresponding channel quality parameter is 3. Then, the second terminal device includes the channel quality parameters of the 79 target channels in an integer array whose length is 10 bytes and that includes 40 elements (namely, an element 0 to an element 39) based on the foregoing description of the format 1, to obtain the first channel quality reporting information in the format 1.

If the target format is the format 2, the second terminal device further determines that the 79 channels between the first terminal device and the second terminal device are target channels. Then, the second terminal device performs quantization processing on channel quality measurement values of the 79 target channels one by one by using a quantization rule (for ease of understanding, the quantization rule is replaced with a second quantization rule below for description) corresponding to the format 2, to obtain channel quality parameters of the 79 target channels. Herein, the second quantization rule is specifically as follows: in response to a channel quality parameter being greater than or equal to a first preset measurement value, a corresponding channel quality parameter is 1. In response to a channel quality parameter being less than a first preset measurement value, a corresponding channel quality parameter is 0. Then, the second terminal device includes the channel quality parameters of the 79 target channels in an integer array whose length is 10 bytes and that includes 80 elements (namely, an element 0 to an element 79) based on the foregoing description of the format 2, to obtain the first channel quality reporting information in the format 2.

If the target format is the format 3, the second terminal device selects 40 channels as target channels. For example, the second terminal device may first sort the 79 channels based on channel quality measurement values, and then select 40 channels that rank top or rank bottom as the target channels. Then, the second terminal device performs quantization processing on channel quality measurement values of the 40 target channels one by one by using a quantization rule (for ease of understanding, the quantization rule is replaced with a third quantization rule below for description) corresponding to the format 3, to obtain channel quality parameters of the 40 target channels. Herein, the third quantization rule is specifically as follows: in response to a channel quality measurement value being 0 or null, a corresponding channel quality parameter is 0. In response to a channel quality parameter being greater than or equal to a first preset measurement value, a corresponding channel quality parameter is 1. In response to a channel quality parameter being greater than a second preset measurement value and less than a first preset measurement value, a corresponding channel quality parameter is 2. In response to a channel quality parameter being greater than 0 and less than or equal to a second preset measurement value, a corresponding channel quality parameter is 3. Then, the second terminal device includes the channel quality parameters of the 40 target channels in an integer array whose length is 10 bytes and that includes 40 elements based on the foregoing description of the format 3, to obtain the first channel quality reporting information in the format 3. Certainly, in response to the second terminal device not calling for report channel quality of the 40 target channels, in response to the format 3 being used for reporting, values of some elements are null or zero.

If the target format is the format 4, the second terminal device selects 20 channels as target channels. For example, the second terminal device determines the 20 target channels from the 79 channels in the foregoing manner described in the format 3. Then, the second terminal device performs quantization processing on channel quality measurement values of the 20 target channels one by one by using a quantization rule (for ease of understanding, the quantization rule is replaced with a fourth quantization rule below for description) corresponding to the format 4, to obtain channel quality parameters of the 40 target channels. Herein, the fourth quantization rule is specifically as follows: in response to a channel quality measurement value being 0 or null, a corresponding channel quality parameter is 0. In response to a channel quality measurement value being greater than or equal to a first preset measurement value, a corresponding channel quality parameter is 1. In response to a channel quality measurement value being greater than or equal to a second preset measurement value and less than a first preset measurement value, a corresponding channel quality parameter is 2. In response to a channel quality measurement value being greater than or equal to a third preset measurement value and less than a second preset measurement value, a corresponding channel quality parameter is 3. By analogy, the fourth quantization rule indicates a correspondence between 16 measurement value intervals and quantized values of 16 channel quality parameters in total. Then, the second terminal device includes the channel quality parameters of the 20 target channels in an integer array whose length is 10 bytes and that includes 20 elements (namely, an element 0 to an element 19) based on the foregoing description of the format 4, to obtain the first channel quality reporting information in the format 4. Herein, each element in the integer array correspondingly carries one channel quality parameter. Certainly, in response to the second terminal device not being called to report channel quality of the 20 target channels, in response to the format 4 being used for reporting, values of some elements are null or zero.

In another optional implementation, the second terminal device determines, based on at least one available channel (which is assumed to be N3 herein) indicated by a second frequency hopping map and at least one second channel determined by the terminal device from the N1 channels based on the channel quality parameters of the channels, whether the second terminal device is to actively generate the first channel quality reporting information and send the first channel quality reporting information to the first terminal device. During implementation, the second terminal device determines the foregoing N3 available channels based on availability indication identifiers that are of the channels and that are in the second frequency hopping map. Then, after obtaining the channel quality measurement value of each of the N1 channels, the second terminal device performs quantization processing on the channel quality measurement value of each channel by using any one of the foregoing first quantization rule, second quantization rule, third quantization rule, or fourth quantization rule, to obtain a channel quality parameter of each channel For a quantization process, refer to the quantization process described above. Details are not described herein again. Then, the second terminal device determines N3 second channels from the N1 channels based on the channel quality parameters of the channels. Optionally, the second terminal device is configured to use a channel whose channel quality parameter is equal to a first preset parameter in the N1 channels as a second channel For example, in response to quantization being performed according to the first quantization rule, the second terminal device determines a channel whose channel quality parameter is equal to 1 in the N1 channels as the second channel. In response to quantization being performed according to the third quantization rule, the second terminal device determines a channel whose channel quality parameter is equal to 2 in the N1 channels as the second channel Alternatively, the second terminal device sorts the N1 channels based on values of the channel quality parameters, and extract N3 channels that rank bottom as second channels. Then, the second terminal device determines, based on N3 available channels indicated by the second frequency hopping map and the N3 second channels, whether to actively send the first channel quality reporting channel to the first terminal device, and generate first channel quality reporting information in the target format in response to determining that the second terminal device is to actively generate and send the first channel quality reporting information. Herein, for a process in which the second terminal device determines whether to generate and send the first channel quality reporting information in the target format, refer to the foregoing process in which the second terminal device determines whether to generate and send the first channel quality reporting information in the target format. Details are not described herein again.

Herein, the second terminal device determines, based on a difference between the at least one available channel indicated by the current second frequency hopping map of the second terminal device and the at least one second channel whose channel quality is good and that is determined by the second terminal device through channel quality assessment, whether to actively send the first channel quality reporting information to the first terminal device. In addition, in response to finding that there is a large difference between the at least one available channel and the at least one second channel (in other words, in response to finding that the second frequency hopping map is inaccurate), the second terminal device actively sends the first channel quality reporting information to the first terminal device. This improves effectiveness of channel quality reporting. Further, the second terminal device further triggers, in a timely manner by using the first channel quality reporting information, the first terminal device to adjust the first frequency hopping map. This ensures accuracy of the first frequency hopping map and the second frequency hopping map, and improve an anti-interference capability of a frequency hopping technology.

Figure 4:
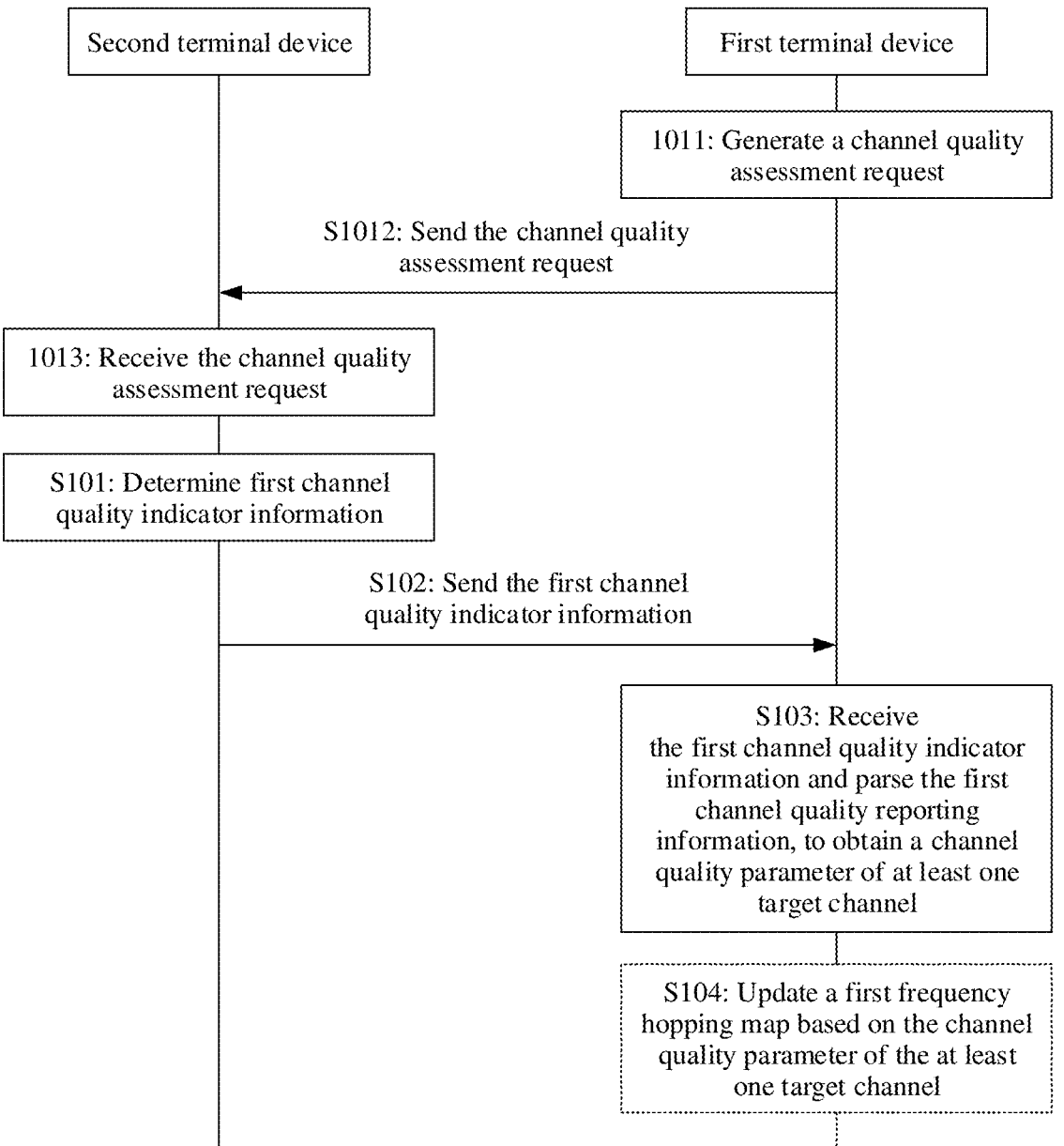
FIG. 4 is another schematic flowchart of a communication method according to some embodiments.

Scenario 2 (The Second Terminal Device Reports the First Channel Quality Reporting Information Based on the Request of the First Terminal Device):

FIG. 4 is another schematic flowchart of a communication method according to some embodiments. From FIG. 4 in the scenario in which the second terminal device reports the first channel quality reporting information based on the request of the first terminal device, before step S101, the communication method provided in some embodiments further includes the following steps.

S1011: The first terminal device generates a channel quality assessment request.

S1012: The first terminal device sends the channel quality assessment request to the second terminal device.

S1013: The second terminal device receives the channel quality assessment request from the first terminal device.

In some feasible implementations, in response to the first terminal device determining that the first terminal device is to actively request the second terminal device to report the first channel quality reporting information, the first terminal device generates a channel quality assessment request. Herein, the channel quality assessment request includes reporting mode indication information. The reporting mode indication information indicates a format of the first channel quality reporting information sent by the second device (the format is the same as the target format described in the scenario 1, and the following continues to use the target format for description). Herein, the target format is any one of the foregoing format 1 to format 4.

Further, in an optional implementation, the channel quality assessment request further includes a first time interval and a second time interval. Herein, the first time interval and the second time interval is empirical values obtained by the first terminal device through a plurality of communication experiments. The reporting mode indication information further indicates how the second terminal device sends the first channel quality reporting information based on the first time interval and/or the second time interval. Specifically, the reporting mode indication information further indicates that the second terminal device sends first channel quality reporting information to the first terminal device for one or more times within the first time interval. Alternatively, the reporting mode indication information further indicates that the second terminal device sends first channel quality reporting information to the first terminal device for one or more times within the second time interval. Alternatively, the reporting mode indication information indicates that the second terminal device sends the first channel quality reporting information to the first terminal device within the second time interval by using the first time interval as a sending interval. Alternatively, the reporting mode indication information indicates that the second terminal device sends first channel quality reporting information to the first terminal device for a plurality of times within the second time interval. In addition, a time interval between each time the first channel quality reporting information is sent and last time first channel quality reporting information is sent is to be less than or equal to the first time interval.

In another optional implementation, the channel quality assessment request further includes a target moment. Herein, the target moment is determined by the first terminal device based on a current moment and a communication delay between the first terminal device and the second device. The reporting mode indication information further indicates how the second terminal device sends the first channel quality reporting information based on the target moment. For example, the reporting mode indication information indicates that the second terminal device sends first channel quality reporting information for one or more times before the target moment. For another example, the reporting mode indication information indicates that the second terminal device sends the first channel quality reporting information once at the target moment.

In addition, the channel quality assessment request further includes one piece of target channel indication information (which further is referred to as a channel map). The target channel indication information indicates at least one channel whose channel quality parameter is to be determined and reported by the second terminal device. At least one channel indicated by the target channel indication information includes the at least one target channel. During implementation, the target channel indication information includes a channel identifier of each of the N1 channels and a report indication identifier corresponding to each channel. Herein, the indication identifier has two values: 0 and 1. In response to a report indication identifier corresponding to a channel being 1, the second terminal device is to determine and report a channel quality parameter of the channel. In response to the reporting indication identifier of the channel being 0, the second terminal device does not call to report the channel quality identifier of the channel Herein, the first terminal device specifies a channel quality parameter of at least one target channel called for by the second terminal device to be determined and reported by the second terminal device. On one hand, the second terminal device does not call to determine channel quality parameters of channels. This reduces a data processing amount of the second terminal device. On the other hand, the first terminal device does not call to subsequently extract a channel quality parameter from another channel other than the target channel This further reduces a data processing amount of the first terminal device.

The following describes three implementations of the channel quality assessment request provided in some embodiments, including an implementation 1, an implementation 2, and an implementation 3.

Implementation 1:

The channel quality assessment request includes the reporting mode indication information, the first time interval, and the second time interval. The channel quality assessment request occupies 7 bytes. The reporting mode indication information occupies 1 byte. The first time interval and the second time interval each occupies one or more of remaining 6 bytes. The reporting mode indication information occupies 8 bits in total, and has 256 values (namely, 0 to 255). The reporting mode indication information correspondingly indicates one or more events by using the 256 different values. For example, the reporting mode indication information indicates, by using different values, two events that the second terminal device enables or disables a capability of actively reporting the first channel quality reporting information. For another example, the reporting mode indication information indicates, by using different values, a plurality of events that the second terminal device sends first channel quality reporting information in the format 1, the format 2, the format 3, or the format 4 based on the first time interval and/or the second time interval. For another example, the reporting mode indication information further indicates, by using different values, a plurality of events that the second device updates the first time interval and/or the second time interval in response to sending first channel quality reporting information in the format 1, the format 2, the format 3, or the format 4 based on the first time interval and/or the second time interval. Herein, in some embodiments, events that is indicated by the first terminal device by using the reporting mode indication information is not limited to the foregoing types, and there is more events. This is not specifically limited in some embodiments.

Optionally, the channel quality assessment request is specifically implemented in a form of an LMP_channel_classification_req packet specified in a Bluetooth standard. The Bluetooth standard in some embodiments includes various versions such as Bluetooth 1.2, Bluetooth 2.0, Bluetooth 3.0, Bluetooth 4.0, Bluetooth 4.1, Bluetooth 4.2 and Bluetooth 5, Bluetooth 5.1, Bluetooth 5.2. This is not specifically limited herein. For details, see the table 1-2. Table 1-2 is a format description table of an LMP_channel_classification_req packet according to some embodiments. As shown in the table 1-2, a length of the LMP_channel_classification_req packet is 7 bytes. A packet type of the packet is DM1. An operation code (OPCode) corresponding to the packet is an operation code 16 that has been allocated for use, or is any operation code that is not allocated for use in the Bluetooth standard. The LMP_channel_classification_req packet is usually sent by a primary device to a secondary device (in other words, sent by the first terminal device to the second terminal device). The LMP_channel_classification_req packet includes an AFH_reporting_mode_ex field (which is a field obtained by extending an AFH_reporting_mode field), an AFH_min_interval field, and an AFH_max_interval field.

TABLE 1-2

| Format description table of an LMP_channel_classification_req packet | | | | | |
|---|---|---|---|---|---|
| Packet name | Packet length (byte) | OpCode (Operation code) | Packet type | Transmission direction | Fields contained |
| LMP_channel_classification_req | 7 | 16 or any OpCode not allocated for use in a Bluetooth standard | DM1 | From a primary device to a secondary device | AFH_reporting_mode_ex AFH_min_interval AFH_max_interval |

During implementation, the first-time interval is carried in the AFH_min_interval field in the LMP_channel_classification_req packet, and the second time interval is carried in the AFH_max_interval field in the LMP_channel_classification_req packet. The reporting mode indication information is carried in the AFH_reporting_mode_ex field. Refer to the table 1-3 below. The table 1-3 is a description table of an AFH_reporting_mode_ex field according to some embodiments. As shown in the table 1-3, a length of the AFH_reporting_mode_ex field is 1 byte, and a data format value of the AFH_reporting_mode_ex field being 1, the AFH_reporting_enabled event is indicated. In response to a value of the AFH_reporting_mode_ex field ranging from 2 to 4, the three events, CQI Req with format #1/2/3 is correspondingly indicated. Herein, for a correspondence between the value of the AFH_reporting_mode_ex field and an event indicated by the value of the AFH_reporting_mode_ex field, refer to content described in the table. Details are not described herein again. Values of 29 to 255 are reserved values for future design.

TABLE 1-3

| | | | |
|---|---|---|---|
| Description table of an AFH_reporting_mode_ex field | | | |
| Field name | Length (byte) | Data format | Data meaning (0 to 255) |
| AFH_reporting_mode_ex | 1 | u_int8 | 0: AFH_reporting_disabled; |
| | | | 1: AFH_reporting_enabled; |
| | | | 2: CQI Req with format #1; |
| | | | 3: CQI Req with format #2; |
| | | | 4: CQI Req with format #3; |
| | | | 5: CQI Immed Req #1 with format #1; |
| | | | 6: CQI Immed Req #1 with format #1 & update min interval; |
| | | | 7: CQI Immed Req #1 with format #1 & update max interval; |
| | | | 8: CQI Immed Req #1 with format #1 & update min max interval; |
| | | | 9: CQI Immed Req #2 with format #1; |
| | | | 10: CQI Immed Req #2 with format #1& update min interval; |
| | | | 11: CQI Immed Req #2 with format #1& update max interval; |
| | | | 12: CQI Immed Req #2 with format #1& update min max interval; |
| | | | 13: CQI Immed Req #1 with format #2; |
| | | | . . . |
| | | | 20: CQI Immed Req #2 with format #2 & update min max interval; |
| | | | 21: CQI Immed Req #1 with format #3; |
| | | | . . . |
| | | | 28: CQI Immed Req #2 with format #3& update min max interval; |
| | | | 29 to 255 for future use | is an 8-bit integer. For example, events that is indicated includes an AFH_reporting_disabled (to be specific, the second terminal device disables the capability of actively reporting the first channel quality reporting information) event, an AFH_reporting_enabled (to be specific, the second terminal device enables the capability of actively reporting the first channel quality reporting information) event, a CQI Req (to be specific, the second terminal device sends first channel quality reporting information for a plurality of times within the second time interval, where a sending interval of the first channel quality reporting information is less than or equal to the first time interval) event, a format #1/2/3 (to be specific, the format of the first channel quality reporting information is the foregoing format 2, format 3, or format 4) event, a CQI Immed Req #1/2 (to be specific, the second terminal device sends the first channel quality reporting information within the first time interval or the second time interval) event, an update min interval (update the first time interval) event, and an update max interval (update the second time interval) event. 8 bits included in the AFH_reporting_mode_ex field corresponds to 256 values, from 0 to 255, and different values correspondingly indicate the foregoing one or more events. For example, in response to a value of the AFH_reporting_mode_ex field being 0, the AFH_reporting_disabled event is indicated. In response to a Implementation 2:

The channel quality assessment request includes the reporting mode indication information, the target moment, and the target channel indication information. The channel quality assessment request occupies 16 bytes. The reporting mode indication information occupies 1 byte. The target moment and the target channel indication information occupies one or more of remaining 15 bytes. The reporting mode indication information occupies 8 bits in total, and has 256 values (namely, 0 to 255). The reporting mode indication information correspondingly indicates a plurality of events by using the 256 different values. For example, the reporting mode indication information indicates, by using different values, two events that the second terminal device enables or disables a capability of actively reporting the first channel quality reporting information. For another example, the reporting mode indication information indicates, by using different values, a plurality of events that the second terminal device sends the first channel quality reporting information in the format 1, the format 2, the format 3, or the format 4 at the target moment or before the target moment. For another example, the reporting mode indication information indicates, by using different values, a plurality of events that the second terminal device sends the first channel quality reporting information in the format 1, the format 2, the format 3, or the format 4 at the target moment or before the target moment, and at least one channel corresponding to the first channel quality reporting information is indicated by the target channel indication information. For another example, the reporting mode indication information indicates, by using different values, a plurality of events that the second terminal device sends the first channel quality reporting information in the format 1, the format 2, the format 3, or the format 4 at the target moment or before the target moment, at least one channel corresponding to the first channel quality reporting information is indicated by the target channel indication information. In addition, the reporting mode indication information further indicates a plurality of events that the second terminal device updates the second frequency hopping map based on at least one target channel indicated by the target indication information. In some embodiments, the scenario of indicating to update the second frequency hopping map is a case of reusing the target channel indication information and the first frequency hopping map of the first terminal device. In other words, the at least one target channel indicated by the target channel indication information is the at least one available channel indicated by the first frequency hopping map. Therefore, the second terminal device adjusts an availability indication identifier that is of the at least one target channel and that is included in the second frequency hopping map to 1, to complete updating of the second frequency hopping map. In some embodiments, events that is indicated by the first terminal device by using the reporting mode indication information is not limited to the foregoing types, and there is more events. This is not specifically limited in some embodiments.

Optionally, the channel quality assessment request is implemented in a form of an LMP_set_AFH packet specified in a Bluetooth standard. For details, see the table 1-4. Table 1-4 is a format description table of an LMP_set_AFH packet is according to some embodiments. As shown in the table 1-4, a length of the LMP_set_AFH packet is 16 bytes. A packet type of the packet is DM1. An operation code corresponding to the packet is an operation code 60 that has been allocated for use, or is any operation code that is not allocated for use in the Bluetooth standard. The LMP_set_AFH packet is usually sent by a primary device to a secondary device (in other words, sent by the first terminal device to the second terminal device). The LMP_set_AFH packet includes an AFH_mode_ex field (which is a field obtained by extending an AFH_mode field), an AFH_instant field, and an AFH_channel_map field.

During implementation, the target moment is carried in the AFH_instant field in the LMP_set_AFH packet, and the target channel indication information is carried in the AFH_channel_map field in the LMP_set_AFH packet. The reporting mode indication information is carried in the AFH_mode_ex field (which is the field obtained by extending the AFH_mode field) in the LMP_set_AFH packet. Refer to the table 1-5 below. The table 1-5 is a description table of an AFH_mode_ex field according to some embodiments. As shown in the table 1-5, a length of the AFH_mode_ex field is 1 byte, and a data format is an 8-bit integer. For example, events that is indicated includes an AFH_reporting_disabled (to be specific, the second terminal device disables the capability of actively reporting the first channel quality reporting information) event, an AFH_reporting_enabled (to be specific, the second terminal device enables the capability of actively reporting the first channel quality reporting information) event, a CQI Req (to be specific, the second terminal device sends the first channel quality reporting information at the target moment) event, a format#1/2/3 (to be specific, the format of the first channel quality reporting information is the foregoing format 2, format 3, or format 4) event, a CQI Immed Req (to be specific, the second terminal device sends the first channel quality reporting information before the target moment) event, and a set AFH (to be specific, the second terminal device updates the second frequency hopping map at the target moment based on the target channel indication information) event. 8 bits included in the AFH_mode_ex field corresponds to 256 values, from 0 to 255, and different values correspondingly indicate one or more different events. For example, in response to a value of the AFH_mode_ex field being 0, the AFH_reporting_disabled event is indicated. In response to a value of the AFH_mode_ex field being 1, the AFH_reporting_enabled event is indicated. In response to a value of the AFH_mode_ex field being 2 to 4, the three events, CQI Req with format #1/2/3 is correspondingly indicated. Herein, for a correspondence between the value of the AFH_mode_ex field and an event indicated by the value of the AFH_mode_ex field, refer to content described in the table. Details are not described herein again. Values of 14 to 255 are reserved values for future design.

TABLE 1-4

| | | Format description table of an LMP_set_AFH packet | | | |
|---|---|---|---|---|---|
| Packet name | Length (byte) | OPCode | Packet type | Transmission direction | Fields Contained |
| LMP_set_AFH | 16 | 60 or any OpCode not allocated for use in a Bluetooth standard | DM1 | From a primary device to a secondary device | AFH_instant AFH_mode_ex AFH_channel_map |

TABLE 1-5

| Field name | Length (byte) | Data format | Data meaning (0 to 255) |
|---|---|---|---|
| AFH_mode_ex | 1 | u_int8 | 0: AFH_reporting_disabled; 1: AFH_reporting_enabled; 2: CQI Req with format #1; 3: CQI Req with format #2; 4: CQI Req with format #3; 5: CQI Req with format #1 & set AFH; 6: CQI Req with format #2 & set AFH; 7: CQI Req with format #3 & set AFH; 8: CQI Immed Req with format #1; 9: CQI Immed Req with format #2; 10: CQI Immed Req with format #3; 11: CQI Immed Req with format #1 & set AFH; 12: CQI Immed Req with format #2 & set AFH; 13: CQI Immed Req with format #3 & set AFH; 14 to 255 for future use |

Description table of an AFH_mode_ex field

Implementation 3:

The channel quality assessment request includes the reporting mode indication information, the target moment, and the target channel indication information. The channel quality assessment request occupies 16 bytes. The reporting mode indication information occupies 2 bytes. One byte (for ease of differentiation, the byte is replaced with a first byte below for description) has 8 bits in total, and has 256 values. Different values indicates different formats of the first channel quality reporting information. For example, in response to a value of the first byte being 0, indicates the format of the first channel quality reporting information is the format 1. In response to a value of the first byte being 1, indicates the format of the first channel quality reporting information is the format 2. In response to a value of the first byte being 2, indicates the format of the first channel quality reporting information is the format 3. In response to a value of the first byte being 3, indicates the format of the first channel quality reporting information is the format 4. The other byte (which is replaced with a second byte below for description) further has 256 values, and indicates two events that the second terminal device enables or disables the capability of actively reporting the first channel quality reporting information, or indicates two events that the second terminal device sends the first channel quality reporting information at the target moment or before the target moment. For example, in response to a value of the second byte being 0, an event that the second terminal device disables the capability of actively reporting the first channel quality reporting information is indicated. In response to a value of the second byte being 1, an event that the second terminal device enables the capability of actively reporting the first channel quality reporting information is indicated. In response to a value of the second byte being 2, an event that the second terminal device sends the first channel quality reporting information before the target moment is indicated. In response to a value of the first byte being 3, an event that the second terminal device sends the first channel quality reporting information at the target moment is indicated. The target moment and the target channel indication information occupies one or more of remaining 15 bytes.

Optionally, during implementation, the channel quality assessment request is implemented by using a CQI_req packet including a CQI_mode field, a CQI_format field, a CQI_instant field, and a CQI_quality_map field. Refer to the table 1-6. The table 1-6 is a description table of a CQI_req packet according to some embodiments. As shown in the table 1-6, a length of the CQI_req packet is 16 bytes. A packet type of the packet is DM1, and an operation code of the packet is any operation code that is not allocated for use in the Bluetooth standard. The packet usually is sent by a primary device to a secondary device.

TABLE 1-6

Format description table of a CQI_req packet

| Packet name | Length in Bytes | OpCode | Packet type | Transmission direction | Fields contained |
|---|---|---|---|---|---|
| CQI_Req | 16 | Any OpCode not allocated for use in a Bluetooth standard | DM1 | From a primary device to a secondary device | CQI_mode CQI_format CQI_instant Channel_quality_map |

During implementation, the target moment is carried in the CQI_instant field. The target channel indication information is carried in the CQI_quality_map field. The first byte of the reporting mode indication information is carried in the CQI_format field, and the second byte is carried in the CQI_mode field. For details, see the table 1-7. Table 1-7 is a content description table of a CQI_req packet is according to some embodiments. As shown in the table 1-7, the CQI_mode field and the CQI_format field each occupy 1 byte. The CQI_instant field occupies 4 bytes. The CQI_quality_map field occupies 10 bytes. A data format of the CQI_mode field is an 8-bit integer. 8 bytes included in the CQI_mode field have 256 values ranging from 0 to 255. In response to a value of the CQI_mode field being 0, the CQI_mode field indicates an AFH_reporting_disabled (to be specific, the second terminal device disables the capability of actively reporting the first channel quality reporting information) event. In response to a value of the CQI_mode field being 1, the CQI_mode field indicates an AFH_reporting_enabled (to be specific, the second terminal device enables the capability of actively reporting the first channel quality reporting information) event. In response to a value of the CQI_mode field being 2, the CQI_mode field indicates a CQI_immediate_reporting (to be specific, the second terminal device reports the first channel quality reporting information before the target moment) event. Values of 3 to 255 is reserved values for future design. A data format of the CQI_format field is further an 8-bit integer, and the 8 bytes included in the CQI_format field have 256 values ranging from 0 to 255. In response to a value of the CQI_format field being 0 to 3, the CQI_format field separately indicates four events that the format of the first channel quality reporting information is the format 1, the format 2, the format 3, or the format 4. Values of 4 to 255 is reserved values for future design. A length of the CQI_instant field is 4 bytes, a data format is a 32-bit integer number, and the CQI_instant field carries the target moment. A length of the channel_quality_map field is 10 bytes. A data format is an integer array including 80 elements. Elements 0 to 78 correspond to availability indication identifiers of 79 channels from the channel 0 to a channel 78. An element 79 is a reserved value for future design.

nal device first determines at least one available channel (assumed to be N4 available channels herein, and N4 is a positive integer greater than or equal to 1) indicated by the first frequency hopping map. Then, the first terminal device extracts, from an information historical record stored in the first terminal device, channel quality reporting information that is received by the first terminal device last time from the second terminal device (for ease of differentiation, the channel quality reporting information is replaced with second channel quality reporting information below for description). Then, the first terminal device determines N4 first channels, based on channel quality parameters of target channels included in the second channel quality reporting information, from the at least one target channel. For example, the first terminal is configured to use a channel whose channel quality parameter is less than or equal to a first preset parameter in the at least one target channel as a first channel Alternatively, the first terminal device sorts the at least one target channel based on the channel quality parameters, and use N4 channels that rank bottom as first channels. Then, the second terminal device determines a quantity of available channels that are in the N4 available channels and that are not included in the N4 second channels (for ease of differentiation, the quantity is replaced with a first quantity below for description), and then determine, based on the first quantity, whether to generate the channel quality assessment request and send the channel quality

TABLE 1-7

| Field name | Length in Bytes | Data format | Field Description |
|---|---|---|---|
| | Content description table of a CQI_req packet | | |
| CQI_mode | 1 | u_int8 | 0: CQI_reporting_disabled<br>1: CQI_reporting_enabled<br>2: CQI_immediate_reporting<br>3 to 255 for future use |
| CQI_format | 1 | u_int8 | 0: format #0;<br>1: format #1;<br>2: format #2;<br>3: format #3;<br>4 to 255 for future use |
| CQI_instant | 4 | u_int32 | Target moment |
| Channel_quality_map | 10 | u_int1[80] | Target channel indication information |

In some embodiments, in the foregoing three implementations, the channel quality assessment request is associated with an event indication set. The event indication set records a relationship between one or more events described in the three implementations and different values of the reporting mode indication information. For example, in the implementation 1, the event indication set records that in response to the reporting mode indication information indicating an event that the second terminal device enables the capability of the first channel quality reporting information, a value of the reporting mode indication information is 0. The event indication set further records that in response to the reporting mode indication information indicating an event that the second terminal device sends the first channel quality reporting information in the format 3 within the first time interval, a value of the reporting mode indication information is 13.

With reference to the foregoing three implementations of the channel quality assessment request, the following briefly describes a process in which the first terminal device generates the channel quality assessment request.

In a implementation, before determining to generate and send the channel quality assessment request, the first termiassessment request to the second terminal device. Optionally, on one hand, in response to determining that the first quantity is greater than or equal to a second preset quantity, the first terminal device determines to generate the channel quality assessment request and send the channel quality assessment request to the second terminal device. Alternatively, the second terminal device calculates a ratio (which is assumed to be D2 herein) of the first quantity to a quantity N1 of channels. In response to determining that D2 is greater than or equal to a second preset ratio, the second terminal device determines to generate the channel quality assessment request and send the channel quality assessment request to the second terminal device. On the other hand, in response to the first terminal device determining that the first quantity is less than a second preset quantity or D2 is less than a second preset ratio, the first terminal device determines that the first terminal device does not call to generate the channel quality assessment request. The first terminal device repeats the foregoing operations of determining channel quality of each channel and subsequently determining whether to generate the channel quality assessment request.

In another implementation, before determining to generate and send the channel quality assessment request, the first terminal device determines a time interval T1 between a moment at which the first terminal device most recently receives channel quality reporting information from the second terminal device and a current moment. in response to determining that the time interval T1 is greater than or equal to a preset time interval, the first terminal device determines to generate and send the channel quality assessment request. in response to determining that the time interval T1 is less than a preset time interval, the first terminal device continues the foregoing operation of determining the time interval T1.

Herein, in response to the first terminal device determining that there is a large difference between the available channel indicated by the first frequency hopping map currently used by the first terminal device and the second channel quality reporting information reported by the second terminal device or the second terminal device has not reported the channel quality assessment result for a long time, the first terminal device requests, in a timely manner, the second terminal device to report the first channel quality information. This improves timeliness and effectiveness of channel quality reporting. In addition, the first terminal device further quickly adjusts the frequency hopping map subsequently based on the first channel quality reporting information, so that timeliness and accuracy of the frequency hopping map designed for the first terminal is improved. This improves an anti-interference capability of the frequency hopping technology.

Further, after determining to generate the channel quality assessment request, the first terminal device first determines the target format corresponding to the first channel quality reporting information. During implementation, in response to the first terminal device determining that the first quantity is greater than or equal to a third preset quantity (the third preset quantity is greater than the second preset quantity), indicates channel quality precision indicated by the second channel quality reporting information is low. In this case, the first terminal device determines that the target format is a format whose quantization precision is higher than quantization precision corresponding to a format of the second channel quality reporting information. In response to determining that the first quantity is greater than the second preset quantity and less than a third preset quantity, the first terminal device determines that the target format is the same as a format of the second channel quality reporting information. In response to a quantity of times of determining that the first quantity is between the second preset quantity and the third preset quantity reaches a preset quantity of times, the first terminal device determines that the target format is a format whose quantization precision is lower than quantization precision corresponding to a format of the second channel quality reporting information. For example, in some embodiments, the second channel quality reporting information is in the format 2. In response to the first terminal device determining that the first quantity is greater than or equal to the third preset quantity, the first terminal device determines that the target format is the format 3 or the format 4. In response to determining that the first quantity is greater than the second quantity and less than the third preset quantity, the first terminal device determines that the target format is the format 2. In response to the quantity of times of determining that the first quantity is greater than the second quantity and less than the third preset quantity reaches the preset quantity of times, the first terminal device determines that the target format is the format 1. Herein, a format of channel quality reporting information initially sent by the second terminal device is specified as the format 1 or the format 2.

Then, optionally, in response to the first terminal device generating the channel quality request based on the content described in the implementation 1, the first terminal device obtains the preset first time interval and second time interval, and determine, based on a service status between the first terminal device and the second terminal, an occasion in which the second terminal device sends the first channel quality reporting information. For example, in response to the first terminal device determining that the service status between the first terminal device and the second terminal is busy (in other words, there are a large quantity of ongoing services), the first terminal device is to adjust the frequency hopping map in a timely manner, to ensure normal execution of these services. Therefore, the first terminal device calls for the second terminal device to send the first channel quality reporting information within the first time interval. in response to the first terminal device determining that the service status between the first terminal device and the second terminal is idle (in other words, there are a small quantity of ongoing services), the first terminal device does not call to adjust the frequency hopping map immediately. Therefore, the first terminal device calls for the second terminal device to send the first channel quality reporting information within the second time interval (regardless of whether the first time interval is used as a sending interval). Certainly, in some embodiments, the first terminal device alternatively determines, based on other status information (for example, data transmission status information) of the first terminal device and the second terminal device, an occasion in which the second terminal device sends the first channel quality reporting information. This is not specifically limited in some embodiments. In addition, in response to finding that the first time interval and/or the second time interval are/is updated, the first terminal device further indicates the second terminal device to update the first time interval and/or the second time interval stored in the first terminal device. Then, after one or more of a plurality of events such as that the first terminal device determines the target format, determines the occasion in which the second terminal device sends the first channel quality reporting information, or determines whether to update the first time interval and/or the second time interval, the first terminal device determines the value of the reporting mode indication information from the value indication set based on these events. Then, the first terminal device stores the value of the reporting mode indication information in the AFH_reporting_mode_ex field in the LMP_channel_classification_req packet, and respectively store the first time interval and the second time interval in the AFH_min_interval field and the AFH_max_interval field in the LMP_channel_classification_req packet, to obtain the channel quality assessment request in the implementation 1.

Optionally, in response to the first terminal device generating the channel quality request described in the foregoing implementation 2 or implementation 3, the first terminal device determines the target moment, and determine, based on a service status between the first terminal device and the second terminal, an occasion in which the second terminal device sends the first channel quality reporting information. For example, in response to the first terminal device determining that the service status between the first terminal device and the second terminal is busy, the first terminal device determines that the second terminal device sends the first channel quality reporting information before the target moment. in response to the first terminal device determining that the service status between the first terminal device and the second terminal is idle, the first terminal device determines that the second terminal device sends the first channel quality reporting information at the target moment. In addition, in response to the target channel indication information determined by the first terminal device being equivalent to the first frequency hopping map, the first terminal device further indicates the second terminal device to update the second frequency hopping map based on the at least one target channel indicated by the target channel indication information. Then, after one or more of a plurality of events such as that the first terminal device determines the target format, determines the occasion in which the second terminal device sends the first channel quality reporting information, or determines whether the second terminal device is to update the second frequency hopping map based on the at least one target channel indicated by the target channel indication information, the first terminal device determines the value of the reporting mode indication information from the value indication set based on these events.

Then, the first terminal device determines the target channel indication information based on a channel quality measurement value of each of the N1 channels that is obtained by the first terminal device by performing channel quality assessment on each channel Herein, to distinguish between results obtained by the first terminal device and the second terminal device by performing channel quality assessment on the N1 channels, a channel quality measurement value of each channel determined by the second terminal device is replaced with a channel quality measurement value below for description, and a channel quality measurement value of each channel determined by the first terminal device is replaced with a second channel quality measurement value below for description. Specifically, after determining the second channel quality measurement value of each channel, the first terminal device sorts the N1 channels based on the second channel quality measurement value of each channel, and determine that a plurality of channels that rank top or a plurality of channels that rank bottom are target channels whose channel quality parameters are to be reported by the second terminal device. Then, the second terminal device adjusts report indication identifiers corresponding to the plurality of target channels in the target channel indication information to 1, and adjust a report indication identifier of a remaining channel to 0, to generate the target channel indication information.

Optionally, in a special scenario in which the first terminal device calls for the second terminal device to report channel quality and further calls for the second terminal device to update the second frequency hopping map based on the first frequency hopping map of the first terminal device, the first terminal device alternatively determines the current first frequency hopping map of the first terminal device as the target channel indication information (in other words, the target channel indication information and the first frequency hopping map is reused, and the two are equivalent). In this way, the at least one target channel indicated by the target channel indication information is the at least one available channel indicated by the current first frequency hopping map. In this scenario, on one hand, the first terminal device indicates, by using the target channel indication information, the second terminal device to report a channel quality parameter of the at least one target channel. On the other hand, the first terminal device alternatively indicates the second terminal device to update the second frequency hopping map. Specifically, the second terminal device is indicated to adjust an availability indication identifier that is of the at least one target channel and that is included in the second frequency hopping map to 1, in other words, determine the at least one target channel in the second frequency hopping map as an available channel. Herein, the first terminal device is unable to indicate, by using the target channel indication information, the second terminal device to report the channel quality parameter of the at least one target channel, but further notify the second terminal device that the at least one target channel is further the available channel determined by the second terminal device, so that the second terminal device updates the second frequency hopping map based on the at least one target channel. In this way, the first terminal device does not call to separately send a first frequency hopping map to trigger the second terminal device to update the second frequency hopping map. This reduces communication resources between the first terminal device and the second terminal device.

Then, the first terminal device stores the value of the reporting mode indication information in the AFH_mode_ex field in the LMP_set_AFH packet, store the target moment in the AFH_instant field, and store the target channel indication information in the AFH_channel_map field, to obtain the channel quality assessment request in the foregoing implementation 2. Alternatively, the first terminal device stores the value of the reporting mode indication information in the CQI_mode field and the CQI_format field in the CQI_req packet, store the target moment in the CQI_instant field, and store the target channel indication information in the CQI_quality_map field, to obtain the channel quality assessment request in the foregoing implementation 3.

In some feasible implementations, after generating the channel quality assessment request, the first terminal device randomly selects one first target available channel from the at least one available channel indicated by the first frequency hopping map. For example, the first terminal device obtains a time identifier that represents a current moment and that is output by a clock module included in the first terminal device. Herein, the time identifier output by the clock module is an absolute time value. Alternatively, the time identifier output by the clock module alternatively is a count value (to be specific, the clock module is a counter, and count values output by the counter correspond to different moments). Then, the first terminal device processes the time identifier by using a preset random number generation algorithm obtain a channel identifier of an available channel in the at least one available channel indicated by the first frequency hopping map, to determine the available channel corresponding to the channel identifier as the first target available channel. Then, the first terminal device sends the channel quality assessment request (to be specific, the LMP_channel_classification_req packet, the LMP_set_AFH packet, or the CQI_req packet that carries content such as the reporting mode indication information) to the second terminal device by using the target available channel.

In some feasible implementations, the second terminal device further determines the first target available channel by using a moment identifier output by a clock module associated with the second terminal device. For a process, refer to the process described in step S1012. Details are not described herein again. In some embodiments, time identifiers output by a clock module associated with the first terminal device are completely the same as time identifiers output by the clock module associated with the second terminal device. In this way, in some embodiments, the first terminal device and the second terminal device work on a same channel at any moment is ensured. Then, the second terminal device receives the channel quality assessment request from the first terminal device by using the first target available channel.

With reference to the foregoing three implementations of the channel quality assessment request, the following separately describes processes in which the second terminal device generates the first channel quality reporting information.

In a scenario of the foregoing implementation 1, after receiving the channel quality assessment request, the second terminal device first performs channel quality assessment on the N1 channels between the first terminal and the second terminal device, to obtain the channel quality measurement value of each of the N1 channels. Herein, for a process in which the second terminal device obtains the channel quality measurement value of each channel, refer to the process in which the second terminal device obtains the channel quality measurement value of each channel described in the scenario 1. Details are not described herein again. Then, the second terminal device extracts the reporting mode indication information, the first time interval, or the second time interval from the channel quality assessment request, and determine, based on the value of the reporting mode indication information and the value indication set, a format (namely, the target format) of first channel quality reporting information to be generated by the second terminal device and an occasion in which the second terminal device sends the first channel quality assessment request. Then, the second terminal device generates the first channel quality reporting information in the target format. Herein, the target format is any one of the foregoing format 1, format 2, format 3, or format 4. For a process in which the second terminal device generates the first channel quality reporting information in the target format, refer to the process in which the second terminal device generates the first channel quality reporting information in the format 1, the format 2, the format 3, or the format 4 described in the scenario 1. Details are not described herein again.

In a scenario of the implementation 2 or the implementation 3, the second terminal device first extracts the reporting mode indication information, the target moment, and the target channel indication information from the channel quality assessment request. Then, the second terminal device determines, based on the value of the reporting mode indication information and the value indication set, a format (namely, the target format) of first channel quality reporting information to be generated by the second terminal device and the at least one target channel indicated by the first channel reporting indication information. Then, the second terminal device performs channel quality assessment on the at least one target channel, to obtain the channel quality measurement value of each target channel. Herein, for a process in which the second terminal device obtains the channel quality measurement value of each target channel, refer to the process in which the second terminal device obtains the channel quality measurement value of each channel described in the scenario 1. Details are not described herein again. Then, the second terminal device generates the first channel quality reporting information in the target format. Herein, the target format is any one of the foregoing format 1, format 2, format 3, or format 4. The first channel quality reporting information includes the channel quality parameter of each target channel. Herein, for a process in which the second terminal device generates the first channel quality reporting information in the target format, refer to the process in which the second terminal device generates the first channel quality reporting information in the format 1, the format 2, the format 3, or the format 4 described in the scenario 1. Details are not described herein again.

Herein, in some embodiments, in response to a quantity of target channels indicated by the target channel indication information being greater than a quantity of channels that is indicated by first channel quality reporting information in a format called for by the first terminal device, the first channel quality reporting information sent by the second terminal device includes a part of target channels in the target channels indicated by the target channel indication information. For example, in some embodiments, the target channel indication information indicates 50 target channels, and the target format is the foregoing format 2. In this case, the first channel quality reporting information sent by the second terminal device includes first 40 target channels or last 40 target channels in the 50 target channels. However, in response to a quantity of target channels indicated by the target channel indication information being less than a quantity of channels that is indicated by first channel quality reporting information in a format called for by the first terminal device, the first channel quality reporting information sent by the second terminal device includes channel quality parameters of the target channels indicated by the target channel indication information and channel quality parameters of one or more channels other than the target channel in the N1 channels. In this case, values of the channel quality parameters of the one or more channels are 0, that is, unknown. For example, in some embodiments, the target channel indication information indicates 30 target channels, and the target format is the foregoing format 2. In this case, the first channel quality reporting information sent by the second terminal device includes the 30 target channels and other 10 channels, and channel quality parameters of the 10 channels are 0.

Herein, the second terminal device generates and sends the first channel quality reporting information after receiving the channel quality assessment request sent by the first terminal device. This avoids a case in which the first terminal sends the first channel quality reporting information to the first terminal device in response to the first terminal having no condition, and avoids waste of communication resources between the first terminal device and the second terminal device.

In some feasible implementations, after generating the first channel quality reporting information in the target format, the second terminal device sends the first channel quality reporting information in the target format to the first terminal device by using a second target available channel indicated by the second frequency hopping map. Herein, for a process in which the second terminal device selects the second target available channel from the at least one available channel indicated by the second frequency hopping map, refer to the process in which the first terminal device determines the first target available channel described in step S1012. Details are not described herein again.

During implementation, after generating the first channel quality reporting information in the target format, the second terminal device first randomly selects an available channel from one or more available channels indicated by the second frequency hopping map. Then, in the foregoing scenario 1, the second terminal device sends the first channel quality reporting information in the target format to the first terminal device at a predetermined moment or within a predetermined time period by using the selected available channel. In the foregoing scenario 2, the second terminal device determines, based on the value of the reporting mode indication information and the event indication set, an occasion in which the second terminal device sends the first channel quality reporting information, and send the first channel quality reporting information in the target format 1 to the first terminal device in the corresponding occasion. For example, in response to the channel quality assessment request using the foregoing implementation 1, after determining, based on the value of the reporting mode indication information and the event indication set, that the second terminal device sends the first channel quality reporting information in the target format within the first time interval or the second time interval, the second terminal device sends the first channel quality reporting information in the target format to the first terminal device at one or more random time nodes within the first time interval or the second time interval. Alternatively, after determining, based on the value of the reporting mode indication information and the event indication set, that the second terminal device sends the first channel quality reporting information in the target format within the second time interval by using the first time interval as the sending interval, the second terminal device sends the first channel quality reporting information in the target format to the first terminal device for a plurality of times within the second time interval by using the first time interval as the sending interval. For another example, in some embodiments, the channel quality assessment request uses the foregoing implementation 2 or implementation 3. After the second terminal device determines, based on the reporting mode indication information, that the second terminal device sends the first channel quality reporting information at the target moment or before the target moment, in response to a moment at which the second terminal device generates the first channel quality reporting information being later than the target moment or is the target moment, the second terminal device immediately sends the first channel quality reporting information to the first terminal device after generating the first channel quality reporting information. In response to a moment at which the second terminal device generates the first channel quality reporting information being before the target moment, the second terminal device sends the first channel quality reporting information in the target format 1 to the first terminal device at one or more random time nodes before the target moment.

In some feasible implementations, the first terminal device receives, by using the second target available channel, the first channel quality reporting information in the target format sent by the second terminal device, and parse the first channel quality reporting information, to obtain the channel quality parameter of the at least one target channel Herein, for a process in which the first terminal device selects the second target available channel from the at least one available channel indicated by the first frequency hopping map, refer to the process in which the first terminal device determines the first target available channel described in step S1012. Details are not described herein again.

Optionally, after obtaining the channel quality parameter of the at least one target channel, the first terminal device further updates, based on the channel quality parameter of the at least one target channel and the channel quality parameter that is of each of the N1 channels and that is determined by the first terminal device, the first frequency hopping map used by the first terminal device. The first terminal device updates the first frequency hopping map based on the channel quality parameter that is reported by the second terminal device and that has appropriate precision, so that precision of the first frequency hopping map is ensured, and an anti-interference capability of the frequency hopping technology is improved. In the following description, to distinguish between the channel quality measurement value and the channel quality measurement parameter that are obtained by the first terminal device or the second terminal device, the channel quality measurement value and the channel quality measurement parameter that are obtained by the second terminal device are replaced with a first channel quality measurement value and a first channel quality parameter for description. The channel quality measurement value and the channel quality measurement parameter that are obtained by the first terminal device are replaced with a second channel quality measurement value and a second channel quality parameter for description.

During implementation, the first terminal device performs channel quality assessment on each of the at least one target channel indicated by the first channel quality reporting information, to obtain a second channel quality measurement value of each target channel. For a process, refer to the foregoing process in which the second terminal device determines the channel quality measurement value of each channel Details are not described herein again. Then, the first terminal device performs quantization processing on the second channel quality measurement value of each target channel by using a quantization rule (the first quantization rule, the second quantization rule, the third quantization rule, or the fourth quantization rule described above) corresponding to the target format, to obtain a second channel quality parameter of each target channel. For a quantization process, refer to the foregoing process in which the second terminal device quantizes the channel quality measurement value. Details are not described herein again. After obtaining a first channel quality parameter and the second channel quality parameter of each target channel, the first terminal device determines availability of each target channel based on the first channel quality parameter and the second channel quality parameter of each target channel, to determine whether each target channel is an available channel. The following briefly describes, based on different target formats, a process in which the second terminal device determines availability of each target channel based on the first channel quality parameter and the second channel quality parameter of each target channel.

It is assumed that the target format is the format 1, the format 2, or the format 3, in an optional implementation. In response to the second terminal device determining that both a first channel quality parameter and a second channel quality parameter of a target channel indicate that channel quality of the target channel is good (in other words, values of both the first channel quality parameter and the second channel quality parameter are 1), the second terminal device determines that the target channel is an available channel. In response to the second terminal device determining that a first channel quality parameter and/or a second channel quality parameter of a target channel indicate/indicates that channel quality of the target channel is unknown, poor, or applicable (in other words, a value of the first channel quality parameter and/or a value of the second channel quality parameter are/is not 1), the second terminal device determines that the target channel is an unavailable channel. In another optional implementation, in response to the second terminal device determining that both a first channel quality parameter and a second channel quality parameter of a target channel indicate that channel quality of the target channel is poor (in other words, values of both the first channel quality parameter and the second channel quality parameter are 1 or 3), the second terminal device determines that the target channel is an unavailable channel. In response to the second terminal device determining that a first channel quality parameter and/or a second channel quality parameter of a target channel indicate/indicates that channel quality of the target channel is unknown, good, or applicable (in other words, a value of the first channel quality parameter and/or a value of the second channel quality parameter are/is not 1 or 3), the second terminal device determines that the target channel is an available channel Optionally, in response to determining that a quantity of available channels in the at least one target channel is less than a preset minimum quantity of available channels, the first terminal device performs supplementary selection of available channels. Herein, the minimum quantity of available channels is predetermined in a communication standard of the first terminal device and the second terminal device. For example, in a BR/EDR mode specified in the Bluetooth standard, the minimum quantity of available channels is 20. During implementation, the first terminal device sorts the N1 channels based on second channel quality measurement values of the channels, and then select one or more channels that are determined as unavailable channels but that rank top to supplement available channels. In this way, a quantity of current available channels reaches or is greater than the minimum quantity of available channels. Alternatively, the first terminal device removes a channel whose channel quality is evaluated as poor by the second terminal device from the N1 channels, sort remaining channels based on second channel quality measurement values, and then select one or more channels that are not available channels but that rank top from the N1 channels to supplement available channels.

It is assumed that the target format is the foregoing format 4, because there are many levels of channel quality parameters corresponding to target channels, the first terminal device calculates an average value of a first channel quality parameter and a second channel quality parameter that correspond to each target channel. Then, the first terminal device determines, as an available channel, a target channel whose average value of the first channel quality parameter and the second channel quality parameter is greater than or equal to a first preset average value in the at least one target channel, and determine, as an unavailable channel, a target channel whose average value of the first channel quality parameter and the second channel quality parameter is less than the first preset average value in the at least one target channel. Alternatively, the first terminal device calculates, with reference to a preset weight, a weighted average value of a first channel quality parameter and a second channel quality parameter that correspond to each target channel. Herein, for each target channel, the first channel quality parameter and the second channel quality parameter of the target channel each correspond to one weight value. For example, in some embodiments, weights of a first channel quality parameter and a second channel quality parameter of a target channel 3 are 0.7 and 0.3 respectively. In response to the first channel quality parameter being 5 and the second channel quality parameter is 7, a weighted average value of the first channel quality parameter and the second channel quality parameter is 5*0.7+7*0.3=5.6. Then, the first terminal device determines, as an available channel, a target channel whose weighted average value of a first channel quality parameter and a second channel quality parameter is greater than or equal to a second preset average value.

Optionally, in response to determining that a quantity of available channels in the at least one target channel is less than a preset minimum quantity of available channels, the first terminal device further is to perform supplementary selection of available channels. Specifically, the first terminal device sorts the target channels based on average values or weighted average values of first channel quality parameters and second channel quality parameters of the target channels, and then selects a target channel that ranks top but that is determined as an unavailable channel to supplement available channels. In this way, a quantity of supplemented available channels is greater than or equal to the minimum quantity of available channels.

After the first terminal device determines availability of each target channel, the first terminal device updates the currently used first frequency hopping map based on an availability determining result of each target channel, to obtain an updated first frequency hopping map. Specifically, the first terminal device adjusts, based on the availability determining result of each target channel, an availability indication identifier that is of the at least one target channel and that is included in the first frequency hopping map. For example, the first terminal device adjusts an availability indication identifier that is of a target channel determined as an available channel and that is in the first frequency hopping map to 1, and adjust an availability indication identifier of a target channel determined as an unavailable channel to 0.

Further, after determining the updated first frequency hopping map, the first terminal device sends the updated first frequency hopping map to the second terminal device. After receiving the updated first frequency hopping map, the second terminal device is configured to use the updated first frequency hopping map as a new second frequency hopping map of the second terminal device, to complete updating of the second frequency hopping map by the second terminal device. After the first terminal device and the second terminal device respectively update the first frequency hopping map and the second frequency hopping map, the first terminal device and the second terminal device performs communication by using available channels indicated by the updated first frequency hopping map and the updated second frequency hopping map.

In this embodiment, the second terminal device adaptively sends the first channel quality reporting information with different precision to the first terminal device. This improves flexibility of channel quality reporting. Further, the first terminal device designs a more accurate first frequency hopping map based on the first channel quality reporting information with appropriate precision. This improves an anti-interference capability of the frequency hopping technology.

Figures 5, 6:
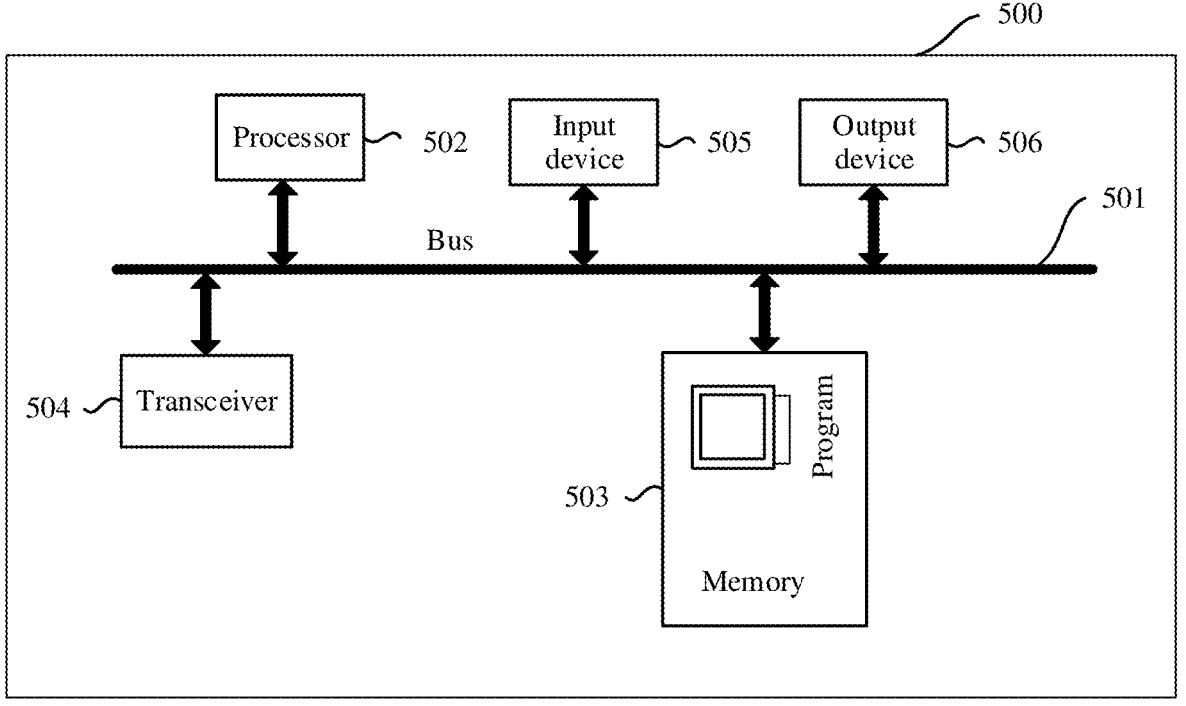
FIG. 5 is a schematic diagram of a structure of a communication apparatus according to some embodiments.
FIG. 6 is a schematic diagram of a structure of another communication apparatus according to some embodiments.

FIG. 5 is a schematic diagram of a structure of a communication apparatus according to some embodiments. Due to a difference in integration levels, the communication apparatus 500 includes one or more of components shown in FIG. 5, and is configured to perform the method or the steps related to the first terminal device in the foregoing embodiments. The components shown in FIG. 5 includes a processor 502, a computer-readable storage medium/memory 503, a transceiver 504, an input device 505, an output device 506, and a bus 501. The processor, the transceiver, the computer-readable storage medium, and the like are connected through the bus. A connection medium between the foregoing components is not limited in some embodiments. In an example, the communication apparatus 500 is an entire device, to implement the method in the foregoing embodiments. For example, the device includes the processor, the transceiver, the input/output device, and the like. In another example, the communication apparatus 500 is a chip system or a processing system, and is used in an entire device to control the entire device to implement the method in the foregoing embodiments. The chip system or the processing system includes the processor, and optionally, further includes the computer-readable storage medium/memory.

The transceiver 504 is configured to support communication between the first terminal device and a second terminal device, and performs a communication or interaction process related to the first terminal device in FIG. 3a or FIG. 4 and/or another process used for the technology described in some embodiments. For example, the transceiver 504 is configured to send the channel quality assessment request in step 51012. For another example, the transceiver 504 is further configured to perform a process of receiving the first channel quality reporting information in step S103.

The processor 502 is configured to control and manage an action of the first terminal device, is configured to perform processing performed by the first terminal device in the foregoing embodiments, performs a processing process related to the first terminal device in FIG. 3a, FIG. 3b, or FIG. 4, is responsible for managing the bus, and executes a program or instructions stored in the memory. For example, the processor 502 is configured to perform a process of generating the channel quality assessment request in step S1011. For another example, the processor 502 is configured to parse the first channel quality reporting information received in step S103, and is further configured to update a first frequency hopping map based on the first channel quality reporting information.

Optionally, the computer-readable storage medium/memory 503 stores a program, instructions, and data for performing the technical solutions of the embodiments. For example, the computer-readable storage medium/memory 503 includes instructions sufficient to allow the apparatus 500 to perform a function related to the first terminal device in the foregoing embodiments.

Optionally, the communication apparatus 500 further includes the input device 505 and the output device 506. The input device 505 and the output device 506 is a display screen, a keyboard, an audio interface, or the like.

In some embodiments, the communication apparatus 500 is configured as a chip or a processing system of the first terminal device. An entire device on which the chip or the processing system is installed performs the method and the steps related to the first terminal device in the foregoing embodiments.

The communication apparatus 500 includes the processor, and optionally, further include the computer-readable storage medium/memory 503. The computer-readable storage medium/memory 503 stores a program, instructions, or data for performing the technical solutions of the embodiments. For example, the computer-readable storage medium/memory 503 includes instructions sufficient to allow the communication apparatus 500 to perform the method and the function in the foregoing embodiments. For example, the processor reads and runs the instructions, and controls a communication apparatus on which the processing system is installed to implement the method and the steps related to the first terminal device in the foregoing embodiments.

Optionally, the processor includes a processing circuit and a communication interface circuit. The processing circuit is configured to parse the first channel quality reporting information received in S103, or is configured to perform an operation of updating the first frequency hopping map based on the first channel quality reporting information in step S103. For another example, the processing circuit is configured to perform an operation of generating the channel quality assessment request in step S1011. The communication interface circuit is configured to output information generated by the processing circuit, and further is configured to input, to the processing circuit for processing, information received by the first terminal device or instructions in the memory.

Optionally, the computer-readable storage medium/memory 503 is an internal memory located inside the processor, or is an external memory located outside the processor and coupled to the processor.

Refer to FIG. 5 together, the communication apparatus 500 is further configured to perform the method or steps related to the second terminal device in the foregoing embodiments. Herein, for descriptions of the structure of the communication apparatus 500, refer to the foregoing descriptions. Details are not described herein again. The transceiver 504 is configured to support communication between the first terminal device and a second terminal device, and performs a communication or interaction process related to the first terminal device in FIG. 3a or FIG. 4 and/or another process used for the technology described in some embodiments. For example, the transceiver 504 is configured to send the channel quality assessment request in step S512. For another example, the transceiver 504 is further configured to perform a process of receiving the first channel quality reporting information in step S53.

In some embodiments, the transceiver 504 is configured to support communication between the second terminal device and the first terminal device, and performs a communication or interaction process related to the second terminal device in FIG. 3a or FIG. 4 and/or another process used for the technology described in some embodiments. For example, the transceiver 504 is configured to send the first channel quality reporting information in step S101. For another example, the transceiver 504 is further configured to receive the channel quality assessment request in step S1013.

The processor 502 is configured to control and manage an action of the second terminal device, is configured to perform processing performed by the second terminal device in the foregoing embodiments, performs a processing process related to the second terminal device in FIG. 3a, FIG. 3b, or FIG. 4, is responsible for managing the bus, and executes a program or instructions stored in the memory. For example, the processor 502 is configured to generate the first channel quality reporting information in step S101. For another example, the processor 502 is configured to parse the channel quality assessment request received in step S1013.

Optionally, the computer-readable storage medium/memory 503 stores a program, instructions, and data for performing the technical solutions of the embodiments. For example, the computer-readable storage medium/memory 503 includes instructions sufficient to allow the communication apparatus 500 to perform functions related to the second terminal device in any one of the foregoing embodiments.

Optionally, the communication apparatus 500 further includes the input device 505 and the output device 506. The input device 505 and the output device 506 is a display screen, a keyboard, an audio interface, or the like.

In some embodiments, the communication apparatus 500 is configured as a chip or a processing system of the second terminal device. An entire device on which the chip or the processing system is installed performs the method and the steps related to the second terminal device in the foregoing embodiments.

The communication apparatus 500 includes the processor, and optionally, further include the computer-readable storage medium/memory 503. The computer-readable storage medium/memory 503 stores a program, instructions, or data for performing the technical solutions of the embodiments. For example, the computer-readable storage medium/memory 503 includes instructions sufficient to allow the communication apparatus 500 to perform the method and the function in the foregoing embodiments. For example, the processor reads and runs the instructions, and controls a communication apparatus on which the processing system is installed to implement the method and the steps related to the second terminal device in the foregoing embodiments.

Optionally, the processor includes a processing circuit and a communication interface circuit. The processing circuit is configured to parse the channel quality assessment request received in S1013, or is configured to perform an operation of determining the first channel quality reporting information in step S101. The communication interface circuit is configured to output information generated by the processing circuit, and further is configured to input, to the processing circuit for processing, information received by the second terminal device or instructions in the memory.

Optionally, the computer-readable storage medium/memory 503 is an internal memory located inside the processor, or is an external memory located outside the processor and coupled to the processor.

FIG. 5 shows a simplified design of the communication apparatus 500. In application, the communication apparatus 500 includes any quantity of transceivers, processors, memories, and the like. Communication apparatuses 500 that implements the embodiments fall within the protection scope of the embodiments.

The processor in the communication apparatus 500 is a general-purpose processor such as a general-purpose central processing unit (CPU), a network processor (Network Processor, NP for short), or a microprocessor, or is an application-specific integrated circuit (ASIC for short), or one or more integrated circuits configured to control program execution in the solutions of the embodiments. The processor is alternatively a digital signal processor (DSP for short), a field programmable gate array (FPGA for short) or other programmable logic device, discrete gate or transistor logic device, or a discrete hardware component. Alternatively, a controller/processor is a combination of processors implementing a computing function, for example, a combination of one or more microprocessors, or a combination of the DSP and the microprocessor. The processor usually performs logical and arithmetic operations according to program instructions stored in the memory.

The computer-readable storage medium/memory further stores an operating system and another application program. Specifically, the program includes program code, and the program code includes computer operation instructions. More specifically, the memory is a read-only memory (ROM for short), another type of static storage device that stores static information and instructions, a random access memory (RAM for short), another type of dynamic storage device that stores information and instructions, a disk memory, or the like. The memory 1803 is a combination of the foregoing storage types. In addition, the computer-readable storage medium/memory is located in the processor, or is located outside the processor, or distributed in a plurality of entities including the processor or a processing circuit. The computer-readable storage medium/memory is specifically embodied in a computer program product. For example, the computer program product includes a computer-readable medium in a packaging material.

FIG. 6 is a schematic diagram of a structure of another communication apparatus according to some embodiments.

The communication apparatus 600 includes a transceiver unit 601 and a processing unit 602.

In some embodiments, the communication apparatus 600 is configured as a first terminal device, or a chip system or a chip in the first terminal device. The communication apparatus 600 performs the method and the steps related to the first terminal device in the foregoing embodiments.

For example, the transceiver unit 601 is configured to support the first terminal device in communicating with a second terminal device in the foregoing embodiments, and performs a receiving and sending process of the first terminal device in FIG. 3a or FIG. 4 and/or another process of the technology described in some embodiments.

In an example, the transceiver unit 601 is configured to receive first channel quality reporting information, and is further configured to send an updated first frequency hopping map. For example, the transceiver unit 601 is configured to perform a process of receiving the first channel quality reporting information in step S103. The processing unit 602 is configured to update a first frequency hopping map based on the first channel quality reporting information. The transceiver unit 601 is further configured to send the updated first frequency hopping map to the second terminal device.

In another example, the transceiver unit 601 is configured to send a channel quality report request. For example, the transceiver unit 601 is configured to perform a process of sending the channel quality assessment request in step S1012. The processing unit 602 is further configured to generate the channel quality assessment request. For example, the processing unit 602 is configured to perform step S1011 in the embodiment.

In some embodiments, the communication apparatus 600 is configured as a second terminal device. For example, the transceiver unit 601 is configured to support the second terminal device in communicating with the first terminal device in the foregoing embodiments, and performs a receiving and sending process related to the second terminal device in FIG. 3a or FIG. 4 and/or another process used for the technology described in some embodiments.

In an example, the transceiver unit 601 is configured to send first channel quality reporting information, and is configured to receive an updated first frequency hopping map sent by the first terminal device. The processing unit 602 is configured to: determine the first channel quality reporting information, or update a second frequency hopping map based on the updated first frequency hopping map. For example, the transceiver unit 601 is configured to perform step S102. The processing unit 602 is configured to perform step S101.

In another example, the transceiver unit 601 is further configured to receive a channel quality assessment request sent by the first terminal device. The processing unit 602 is further configured to generate, based on the channel quality assessment request, the first channel quality reporting information indicated by the first terminal device. For example, the transceiver unit 601 is further configured to perform step S1013. The processing unit 602 is configured to perform step S101.

For example, the communication apparatus 600 is a chip or a chip system, the transceiver unit 601 in the chip or the chip system is an input/output interface, and the processing unit 602 is a processing circuit. In the foregoing embodiments, "send" is "output", and "receive" is "input". Therefore, the input/output interface completes signaling or data interaction, and the processing circuit completes signaling or data information generation and processing.

Optionally, the communication apparatus 600 is further coupled to a memory. The memory stores instructions. In response to the processing circuit running the instructions, the communication apparatus 600 is enabled to perform the method and the steps in any one of the foregoing embodiments. For example, the memory is a storage unit included in the communication apparatus 600, or is an external storage unit outside the communication apparatus 600.

Figure 7:
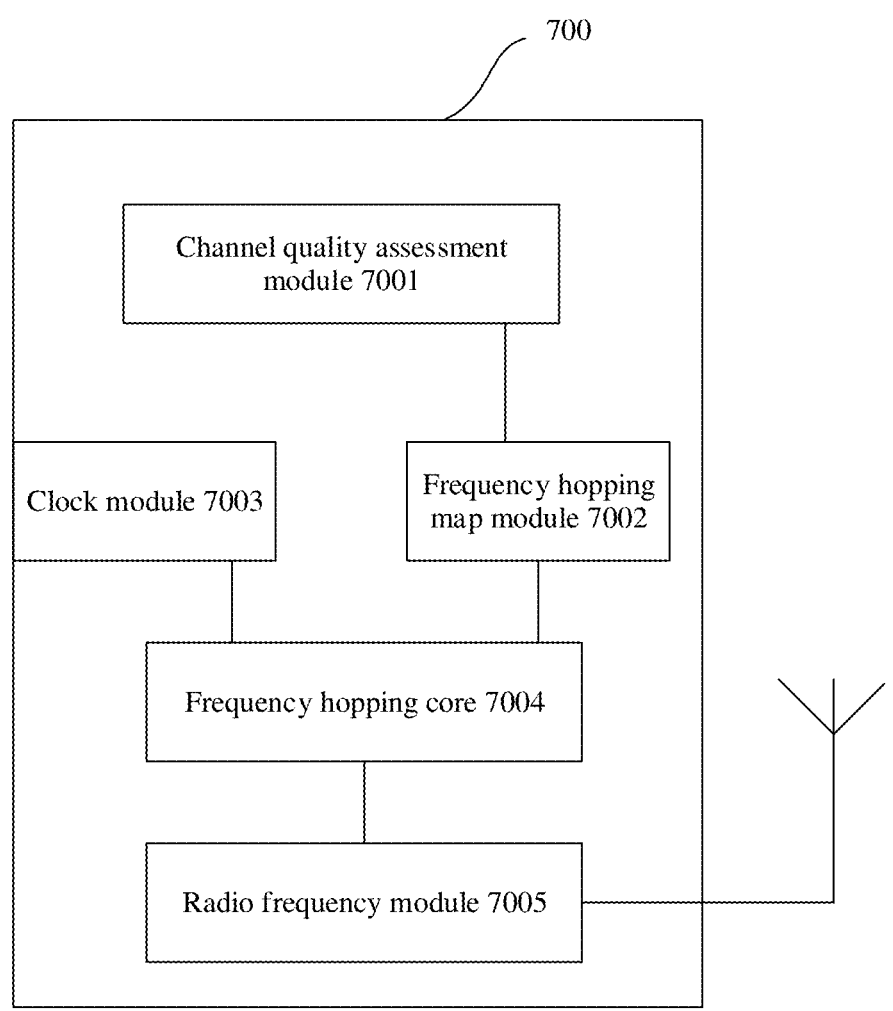
FIG. 7 is a schematic diagram of a structure of still another communication apparatus according to some embodiments.

FIG. 7 is a schematic diagram of a structure of still another communication apparatus according to some embodiments. The communication apparatus 700 includes a channel quality assessment module 7001, a frequency hopping map module 7002, a clock module 7003, a frequency hopping core 7004, and a radio frequency module 7005.

In some embodiments, the communication apparatus 700 is configured as a first terminal device, or a chip system or a chip in the first terminal device. The communication apparatus 700 performs the method and the steps related to the first terminal device in the foregoing embodiments.

In an example, the clock module 7003, the frequency hopping map module 7002, and the frequency hopping core 7004 is configured to generate one second target available channel. For example, the clock module outputs a time identifier to the frequency hopping core 7004. Then, the frequency hopping core 7004 selects, based on the time identifier, one second target available channel from a first frequency hopping map stored in the frequency hopping map module 7002. The radio frequency module 7005 receives, by using the second target available channel, first channel quality reporting information sent by a second terminal device. The channel quality assessment module 7001 updates the first frequency hopping map based on the first channel quality reporting information received by the radio frequency module 7005, and send an updated first frequency hopping map to the frequency hopping map module 7002 for storage.

In another example, the channel quality assessment module 7001 further determines, based on at least one available channel indicated by a first frequency hopping map stored in the frequency hopping map module 7002 and a first channel indicated by second channel quality reporting information reported by a second terminal device, whether a channel quality assessment request is to be generated, and generate the channel quality assessment request in response to determining that the channel quality assessment request is to be generated. The clock module 7003, the frequency hopping map module 7002, and the frequency hopping core 7004 is further configured to generate one first target available channel. The radio frequency module 7005 further sends the channel quality assessment request to the second terminal device by using the first target available channel.

In some embodiments, the communication apparatus 700 is configured as a second terminal device, or a chip system or a chip in the second terminal device. The communication apparatus 700 performs the method and the steps related to the second terminal device in the foregoing embodiments.

In an example, the channel quality assessment module 7001 determines, based on at least one available channel indicated by a second frequency hopping map stored in the frequency hopping map module 7002 and a second channel determined by the channel quality assessment module 7001, whether first channel quality reporting information is to be actively reported, and generate the first channel quality reporting information in response to determining that the first channel quality reporting information is to be actively reported. The clock module 7003, the frequency hopping map module 7002, and the frequency hopping core 7004 is configured to generate the foregoing second target available channel. The radio frequency module 7005 sends the first channel quality reporting information to the first terminal device by using the second target available channel. The channel quality assessment module 7001 further updates the second frequency hopping map based on an updated first frequency hopping map sent by the first terminal device, and send an updated second frequency hopping map to the frequency hopping map module 7002 for storage.

In another example, the clock module 7003, the frequency hopping map module 7002, and the frequency hopping core 7004 is configured to generate the foregoing first target available channel. The radio frequency module 7005 receives a channel quality report request by using the first target available channel. The channel quality assessment module 7001 further generates the first channel quality reporting information based on the channel quality report request. The clock module 7003, the frequency hopping map module 7002, and the frequency hopping core 7004 is further configured to generate one second target available channel. The radio frequency module 7005 further sends the first channel quality reporting information to the first terminal device by using the second target available channel.

Some embodiments further provide a chip system. The chip system includes a processor, configured to support a first terminal device or a second terminal device to implement a function in the foregoing embodiments, for example, generating or processing data and/or information in the foregoing method. In some embodiments, the chip system further includes a memory. The memory is configured to store program instructions and data that are for a transmit end or a receive end. In response to the processor running the program instructions, a device mounted in the chip system is enabled to perform the method in any one of the foregoing embodiments. The chip system includes a chip, or includes a chip and another discrete component.

Some embodiments further provide a processor, configured to be coupled to a memory. The memory stores instructions. In response to the processor running the instructions, the processor is enabled to perform the method and the function related to the first terminal device or the second terminal device in the foregoing embodiments.

Some embodiments further provide a computer program product including instructions. In response to the computer program product running on a computer, the computer performs the method and the function related to the first terminal device or the second terminal device in the foregoing embodiments.

Some embodiments further provide a computer-readable storage medium. The readable storage medium stores instructions. In response to a processor running the instructions, the processor is enabled to perform the method and the function related to the first terminal device or the second terminal device in the foregoing embodiments.

Some embodiments further provide a wireless communication system. The system includes at least one first terminal device and at least one second terminal device in the foregoing embodiments.

Method or algorithm steps described in combination with the content disclosed in some embodiments are implemented by hardware, or is implemented by a processor by executing software instructions. The software instructions includes a corresponding software module. The software module is stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor reads information from the storage medium or write information into the storage medium. Certainly, the storage medium is a component of the processor. The processor and the storage medium is disposed in an ASIC. In addition, the ASIC is located in user equipment. Certainly, the processor and the storage medium exists in the user equipment as discrete components.

A person skilled in the art is aware that in the foregoing one or more examples, functions described in some embodiments are implemented by hardware, software, firmware, or any combination thereof. In response to the functions being implemented by software, the foregoing functions are stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium is any available medium accessible to a general-purpose or a dedicated computer.

In the foregoing implementations, the objectives, technical solutions, and beneficial effects of the embodiments are further described in detail. The foregoing descriptions are implementations of the embodiments, but are not intended to limit the protection scope of the embodiments. Any modification, equivalent replacement, improvement, or the like made based on the technical solutions of the embodiments shall fall within the protection scope of the embodiments.

What is claimed is:

1. A communication method in a wireless communication system, comprising:
receiving, by a first terminal device, first channel quality reporting information from a second terminal device, wherein:
a format of the first channel quality reporting information is one of at least two preset formats;
the first channel quality reporting information includes a channel quality parameter of at least one target channel determined; and
the target channel is a radio channel between the second terminal device and the first terminal device;
parsing, by the first terminal device, the first channel quality reporting information to obtain the channel quality parameter of the at least one target channel;
updating, by the first terminal device, a first frequency hopping map based on the channel quality parameter of the at least one target channel, wherein the first frequency hopping map is useable by the first terminal device to determine at least one available channel between the first terminal device and the second terminal device; and
sending, by the first terminal device, a channel quality assessment request to the second terminal device, wherein:
the channel quality assessment request includes reporting mode indication information that indicates the format of the first channel quality reporting information.

2. The method according to claim 1, wherein the channel quality parameter indicates whether a quality of a corresponding channel is good, poor or unknown.

3. The method according to claim 1, wherein:
precision of channel quality parameters included in first channel quality reporting information is in different formats.

4. The method according to claim 1, wherein:
the channel quality assessment request further includes a first time interval and a second time interval that is greater than the first time interval; and
the reporting mode indication information further indicates that the second terminal device sends the first channel quality reporting information within the first time interval;
the reporting mode indication information further indicates that the second terminal device sends the first channel quality reporting information within the second time interval; or
the reporting mode indication information further indicates that the second terminal device sends the first channel quality reporting information within the second time interval by using the first time interval as a sending interval.

5. The method according to claim 1, wherein:
the channel quality assessment request further includes a target moment; and
the reporting mode indication information further indicates that the second terminal device sends the first channel quality reporting information before the target moment.

6. The method according to claim 5, wherein:
the channel quality assessment request further includes target channel indication information that indicates the at least one target channel.

7. The method according to claim 6, wherein:
the at least one available channel indicated by the first frequency hopping map is the same as the at least one target channel indicated by the target channel indication information;
the reporting mode indication information further indicates that the second terminal device updates a second frequency hopping map based on the at least one target channel; and
the second frequency hopping map is used by the second terminal device to determine the at least one available channel between the first terminal device and the second terminal device.

8. The method according to claim 1, further comprising:
receiving, by the first terminal device, second channel quality reporting information from the second terminal device;
determining, by the first terminal device, at least one first channel indicated by the second channel quality reporting information, wherein:
a channel quality parameter of the first channel is less than or equal to a first preset parameter; or
the channel quality parameter of the first channel is greater than a channel quality parameter of a channel other than the first channel in channels indicated by the second channel quality reporting information;
determining, by the first terminal device, the at least one available channel indicated by the first frequency hopping map;
determining, by the first terminal device, a first quantity of channels that do not coexist in the at least one available channel and the at least one first channel; and
determining, by the first terminal device based on the first quantity, to trigger performing an operation of sending the channel quality assessment request to the second terminal device.

9. The method according to claim 7, further comprising:
sending an updated first frequency hopping map to the second terminal device, wherein:

the updated first frequency hopping map is usable by the second terminal device to update the second frequency hopping map; and the second frequency hopping map is usable by the second terminal device to determine the at least one available channel between the first terminal device and the second terminal device.

10. A communication method in a wireless communication system, comprising:

determining, by a first terminal device, first channel quality reporting information, wherein:

a format of the first channel quality reporting information is one of at least two preset formats;

the first channel quality reporting information includes a channel quality parameter of at least one target channel determined by the first terminal device; and the target channel is a radio channel between the first terminal device and a second terminal device;

sending, by the first terminal device, the first channel quality reporting information to the second terminal device; and receiving, by the first terminal device, a channel quality assessment request from the second terminal device, wherein the channel quality assessment request includes reporting mode indication information that indicates the format of the first channel quality reporting information.

11. The method according to claim 10, wherein:

precision of channel quality parameters included in first channel quality reporting information is in different formats.

12. The method according to claim 10, wherein:

the channel quality assessment request further includes a first time interval and a second time interval that is greater than the first time interval; and the sending, by the first terminal device, the first channel quality reporting information to the second terminal device comprises:

determining, by the first terminal device, the first time interval or the second time interval based on the reporting mode indication information; and sending, by the first terminal device, the first channel quality reporting information to the second terminal device within the first time interval or the second time interval.

13. The method according to claim 12, wherein:

the channel quality assessment request includes the first time interval and the second time interval that is greater than the first time interval; and the sending, by the first terminal device, the first channel quality reporting information to the second terminal device comprises:

determining, by the first terminal device, the first time interval and the second time interval based on the reporting mode indication information; and sending, by the first terminal device, the first channel quality reporting information to the second terminal device within the second time interval by using the first time interval as a sending interval.

14. The method according to claim 12, further comprising:

requesting a target moment by the first channel quality reporting; and the sending, by the first terminal device, the first channel quality reporting information to the second terminal device comprises sending the first channel quality reporting information at least one time prior to the target moment.

15. The method according to claim 14, wherein:

the channel quality assessment request further includes target channel indication information; and the target channel indication information indicates the at least one target channel.

16. The method according to claim 15, wherein:

the first channel quality reporting information is usable by the second terminal device to update a first frequency hopping map; and the first frequency hopping map is usable by the second terminal device to determine at least one available channel between the second terminal device and the first terminal device.

17. The method according to claim 16, further comprising:

the at least one available channel indicated by the first frequency hopping map is the same as the at least one target channel indicated by the target channel indication information; and determining, by the first terminal device, a value of the reporting mode indication information based on the reporting mode indication information; and updating a second frequency hopping map by using the at least one target channel, wherein:

the second frequency hopping map is usable by the first terminal device to determine the at least one available channel between the second terminal device and the first terminal device.

18. The method according to claim 17, wherein:

the determining the first channel quality reporting information comprises:

determining, by the first terminal device, the at least one target channel based on the target channel indication information;

performing, by the first terminal device, the channel quality assessment on the at least one target channel to obtain a channel quality parameter of each target channel in the at least one target channel; and generating, by the first terminal device based on a channel quality parameter of a target channel, the first channel quality reporting information in a format indicated by the reporting mode indication information.

19. The method according to claim 18, further comprising:

determining, by the first terminal device, the at least one available channel based on the second frequency hopping map;

performing, by the first terminal device, the channel quality assessment on channels between the first terminal device and the second terminal device, to obtain channel quality parameters of the channels;

determining, by the first terminal device, at least one second channel from the channels based on the channel quality parameters of the channels, wherein:

a channel quality parameter of the second channel is less than or equal to a second preset parameter; or the channel quality parameter of the second channel is greater than a channel quality parameter of a channel other than the second channel in the channels;

determining, by the first terminal device, a second quantity of channels that do not coexist in at least one available channel indicated by the second frequency hopping map and the at least one second channel, wherein:

the second frequency hopping map is usable by the first terminal device to determine the at least one available channel between the second terminal device and the first terminal device; and determining, by the first terminal device based on the second quantity, to perform an operation of determining the first channel quality reporting information.

20. The method according to claim 17, further comprising:

receiving, by the first terminal device, an updated first frequency hopping map from the second terminal device; and updating, by the first terminal device, the second frequency hopping map based on the updated first frequency hopping map.

21. A wireless communication system, comprising:

a first terminal, wherein the first terminal is configured to:

receive first channel quality reporting information from a second terminal device, wherein:

a format of the first channel quality reporting information is one of at least two preset formats;

the first channel quality reporting information includes a channel quality parameter of at least one target channel determined; and the target channel is a radio channel between the second terminal device and the first terminal device;

parse the first channel quality reporting information to obtain the channel quality parameter of the at least one target channel;

update a first frequency hopping map based on the channel quality parameter of the at least one target channel, wherein the first frequency hopping map is useable by the first terminal device to determine at least one available channel between the first terminal device and the second terminal device; and send a channel quality assessment request to the second terminal device, wherein:

the channel quality assessment request includes reporting mode indication information that indicates the format of the first channel quality reporting information.

* * * * *